United States Patent [19]
Passint et al.

[11] Patent Number: 5,970,232
[45] Date of Patent: Oct. 19, 1999

[54] ROUTER TABLE LOOKUP MECHANISM

[75] Inventors: Randal S. Passint, Chippewa Falls, Wis.; Michael B. Galles, Los Altos, Calif.; Greg Thorson, Altoona, Wis.

[73] Assignee: Cray Research, Inc., Eagan, Minn.

[21] Appl. No.: 08/971,587

[22] Filed: Nov. 17, 1997

[51] Int. Cl.⁶ .............................. G06F 13/00; H04L 12/54
[52] U.S. Cl. .................... 395/200.68; 370/351; 370/389; 395/800.13
[58] Field of Search .......................... 395/200.7, 800.16, 395/200.6, 800.11, 200.71, 200.53, 800.13, 200.72, 800.14, 200.31, 500, 200.69, 200.68, 800.22; 364/489, 488, 490, 491, 418.28, DIG. 1, DIG. 2; 371/49.3; 370/389, 351, 380

[56] References Cited

U.S. PATENT DOCUMENTS

| Re. 28,577 | 10/1975 | Schmidt | 179/15 |
|---|---|---|---|
| 4,330,858 | 5/1982 | Choquet | 370/111 |

(List continued on next page.)

FOREIGN PATENT DOCUMENTS

| 0501524A2 | 5/1984 | European Pat. Off. . |
|---|---|---|
| 0353819B1 | 2/1990 | European Pat. Off. . |
| 0501524A3 | 2/1992 | European Pat. Off. . |
| 0473452A2 | 3/1992 | European Pat. Off. . |
| 0475282 A3 | 3/1992 | European Pat. Off. . |
| 0475282A2 | 3/1992 | European Pat. Off. . |
| 0479520A3 | 4/1992 | European Pat. Off. . |
| 0501524A2 | 9/1992 | European Pat. Off. . |
| 0570729A2 | 4/1993 | European Pat. Off. . |
| 0570729A2 | 11/1993 | European Pat. Off. . |
| 0570729A3 | 11/1993 | European Pat. Off. . |
| 88/08652 | 4/1988 | WIPO . |
| 87/01750 | 6/1988 | WIPO . |
| 95/16236 | 6/1995 | WIPO . |

OTHER PUBLICATIONS

"Deadlock–Free Routing Schemes on Multistage Interconnection Networks", *IBM Technical Disclosure Bulletin*, 35, 232–233, (Dec., 1992).

Adve, V.S., et al., "Performance Analysis of Mesh Interconnection Networks with Deterministic Routing", *Transactions on Parallel and Distributed Systems*, 225–246, (Mar. 1994).

Bolding, K., "Non–Uniformities Introduced by Virtual Channel Deadlock Prevention", *Technical Report UW CSE–92–07–07*, University of Washington, Seattle, WA, (Jul. 12, 1992), (List continued on next page.)

*Primary Examiner*—Daniel H. Pam
*Attorney, Agent, or Firm*—Schwegman, Lundberg, Woessner, and Kluth, P.A.

[57] ABSTRACT

A multiprocessor computer system includes processing element nodes interconnected by physical communication links in a n-dimensional topology, which includes at least two global partitions. Routers route messages between processing element nodes and include ports for receiving and sending messages, and lookup tables having a local router table having directions for routing between processor element nodes within a global partition, and a global router table having directions for routing between processor element nodes located in different global partitions. The directions from the local table are selected for routing from the next router along a given route if the current processing element node is in a destination global partition or if the current processing element node is one plus or minus hop from reaching the destination global partition and the route is exiting on a port that routes to the destination global partition, else the directions from the global router table are selected for routing from the next router.

7 Claims, 21 Drawing Sheets

U.S. PATENT DOCUMENTS

| | | | |
|---|---|---|---|
| 4,630,259 | 12/1986 | Larson et al. | 370/60 |
| 4,771,391 | 9/1988 | Blasbalg | 364/514 |
| 4,811,214 | 3/1989 | Nosenchuck et al. | 364/200 |
| 4,868,818 | 9/1989 | Madan et al. | 371/11 |
| 4,933,933 | 6/1990 | Dally et al. | 370/60 |
| 4,980,822 | 12/1990 | Brantley et al. | 364/200 |
| 5,008,882 | 4/1991 | Peterson et al. | 370/943 |
| 5,031,211 | 7/1991 | Nagai et al. | 379/221 |
| 5,036,459 | 7/1991 | Den Haan et al. | 364/200 |
| 5,081,623 | 1/1992 | Ainscow | 370/85.4 |
| 5,105,424 | 4/1992 | Flaig et al. | 370/941 |
| 5,117,350 | 5/1992 | Parrish et al. | 395/425 |
| 5,134,690 | 7/1992 | Samatham | 395/200 |
| 5,157,692 | 10/1992 | Horie et al. | 375/38 |
| 5,161,156 | 11/1992 | Baum et al. | 371/7 |
| 5,170,482 | 12/1992 | Shu et al. | 395/800 |
| 5,175,733 | 12/1992 | Nugent | 370/94 |
| 5,195,100 | 3/1993 | Katz et al. | 371/66 |
| 5,201,044 | 4/1993 | Frey, Jr. et al. | 395/575 |
| 5,210,705 | 5/1993 | Chauvel et al. | 364/572 |
| 5,218,601 | 6/1993 | Chujo et al. | 370/16 |
| 5,218,676 | 6/1993 | Ben-ayed et al. | 395/200 |
| 5,233,618 | 8/1993 | Glider et al. | 371/68.1 |
| 5,239,545 | 8/1993 | Buchholz | 370/95.3 |
| 5,274,799 | 12/1993 | Brant et al. | 395/575 |
| 5,276,899 | 1/1994 | Neches | 395/800 |
| 5,280,474 | 1/1994 | Nicokolls et al. | 370/60 |
| 5,297,137 | 3/1994 | Ofek et al. | 370/60 |
| 5,303,244 | 4/1994 | Watson | 371/10.1 |
| 5,313,628 | 5/1994 | Mendelsohn et al. | 395/575 |
| 5,313,645 | 5/1994 | Rolfe | 395/800 |
| 5,331,631 | 7/1994 | Teraslinna | 370/60 |
| 5,333,279 | 7/1994 | Dunning | 395/325 |
| 5,341,504 | 8/1994 | Mori et al. | 395/800 |
| 5,345,565 | 9/1994 | Jibbe et al. | 395/325 |
| 5,347,450 | 9/1994 | Nugent | 395/200 |
| 5,353,283 | 10/1994 | Tsuchiya | 370/60 |
| 5,365,228 | 11/1994 | Childs et al. | 340/825.8 |
| 5,383,191 | 1/1995 | Hobgood et al. | 371/112 |
| 5,390,164 | 2/1995 | Kremer | 370/16 |
| 5,402,428 | 3/1995 | Kakuta et al. | 371/10.1 |
| 5,434,995 | 7/1995 | Oberlin et al. | 395/550 |
| 5,440,547 | 8/1995 | Easki et al. | 370/60 |
| 5,444,701 | 8/1995 | Cypher et al. | 370/60 |
| 5,452,444 | 9/1995 | Solomon et al. | 395/182.04 |
| 5,453,978 | 9/1995 | Sethu et al. | 370/60 |
| 5,475,858 | 12/1995 | Gupta et al. | 395/800 |
| 5,499,337 | 3/1996 | Gordon | 395/182.04 |
| 5,513,192 | 4/1996 | Janku et al. | 371/50.1 |
| 5,517,497 | 5/1996 | LeBoudec et al. | 370/60.1 |
| 5,519,844 | 5/1996 | Stallmo | 395/441 |
| 5,522,031 | 5/1996 | Ellis et al. | 395/182.04 |
| 5,530,948 | 6/1996 | Islam | 395/182.04 |
| 5,533,198 | 7/1996 | Thorson | 395/200.15 |
| 5,546,549 | 8/1996 | Barrett et al. | 395/309 |
| 5,546,596 | 8/1996 | Geist | 370/94.3 |
| 5,548,639 | 8/1996 | Ogura et al. | 395/221 |
| 5,550,589 | 8/1996 | Shiojiri et al. | 348/387 |
| 5,555,542 | 9/1996 | Ogura et al. | 370/94.1 |
| 5,590,284 | 12/1996 | Crosetto | 395/200.25 |
| 5,596,742 | 1/1997 | Agamal et al. | 395/500 |
| 5,659,796 | 8/1997 | Thorson et al. | 395/200.71 |
| 5,721,819 | 2/1998 | Galles et al. | 395/200.15 |

OTHER PUBLICATIONS

Bolla, F.R., "A Neural Strategy for Optimal Multiplexing of Circuit and Packet–Switched Traffic", *Department of Communications, Computer and Systems Science (DIST)*, University of Genova, 1324–1330.

Boura, Y.M., et al., "Efficient Fully Adaptive Wormhole Routing in n–dimenstional Meshes", *IEEE*, 589–596, (1994).

Bundy, A., et al., "Turning Eureka Stepsinto Calculations in Automatic Program", *UK IT, (IEE Conf. Pub. 316)*, pp. 221–226, (1991).

Carlile, B.R., "Algorithms and Design: The CRAP APP Shared–Memory System", *Comcon Spring '93*, pp. 312–320, Feb. 22, 1993, San Francisco, CA.

Chien, A.A., et al., "Planar–Adaptive Routing: Low–Cost Adaptive Networks for Multiprocessors", *Pro. 19th International. Symposium on Computer Architecture*, 268–277, (May 1992).

Dally, W., "Performance Analysis of k–ary n–cube Interconnection Networks", *IEEE Transactions on Computers*, vol. 39, No. 6, 775–785, (Jun. 1990).

Dally, W., et al., "Deadlock–Free Message Routing in Multiprocessor Interconnection Networks", *IEEE Transactions on Computers*, C–36, 547–553, (May, 1987).

Dally, W.J., "Virtual Channel Flow Control", *Pro. 17th International Symposium on Computer Architecture*, pp. 60–68, May 1990.

Dally, W.J., et al., "Deadlock–Free Adaptive Routing in Multicomputer Networks Using Virtual Channels", *I.E.E.E. Transactions on Parallel and Distributed Systems*, vol. 4, No. 4, 466–475, (Apr. 1993).

Duato, J., "A New Theory of Deadlock–Free Adaptive Routing in Wormhole Networks", *I.E.E.E. Transactions on Parallel and Distributed Systems*, vol. 4, No. 12, at 1320–1331, Dec. 1993.

Gallager, R., "Scale Factors for Distributed Routing Algorithm", *NTC '77 Conference Record*, 2, at 2–1 through 2–5.

Glass, C.J., et al., "The Turn Model for Adaptive Routing", *Pro. 19th Interanational Symposium on Computer architecture*, 278–287, (May 1992).

Gravano, L., et al., "Adaptive Deadlock– and Livelock–Free Routing with all Minimal Paths in Torus Networks", *IEEE Transactions on Parellel and Distributed Systems*, vol. 5, No. 12, 1233–1251, (Dec. 1994).

Gupta, R., et al., "High speed Synchronization of Processors Using Fuzzy Barriers", *International Journakl of Parallel Programming 19* (1990) Feb., No. 1, New York, US pp. 53–73.

Ishihata, H., et al., "Architecture of Highly Parallel AP1000 Computer", *Scripta Technica*, Inc., Systems and Computers in Japan 24, No. 7,, pp. 69–76, (1993).

Jesshope, C.R., et al., "High Performance Communications in Processor Networks", *Proc. 16th International Symposium on Computer Architecture*, at 150–157, (May 1989).

Kirkpatrick, S., et al., "Optimization by Simulated Annealing", *Science*, May 13, 1993, vol. 220, No. 4598, 671–680.

Linder, D., et al., "An Adaptive and Fault Tolerant Wormhole Routing Strategy for k–ary n–cues", *IEEE Transactions on Computers*, 40,, 2–12, (Jan., 1991).

Lui, Z., et al., "Grouping Virtual Channels for Deadlock–Free Adaptive Wormhole Routing", *PARLE '93 Parallel Parallel Architectures and Languages Europe, 5th International PARLE Conference*, Munich, Germany\. 255–265, (Jun. 14–17, 1993).

Nuth, P., et al., "The J–Machine Network", *IEEE*, 420–423, (1992).

O'Keefe, M.T., et al., "Static Barrier MIMD: Architecture and Performance Analysis", *Journal of Parallel and Distrubuted Computing No. 2,*, pp. 126–132, (Mar. 25, 1995).

Shumay, M., "Deadlock–Free Packet Networks", *Transputer Research and Applications 2, NATUG–2 Proceedings of the Second Conference of the North American Transputer Users Group*, 140–177, (Oct. 18–19, 1989).

Snyder, L., "Introduction to the Configurable, Highly Parallel Computer", *IEEE*, 47–56, (Jan. 1982).

Talia, D., "Message–Routing Systems for Transputer–Based Multicomputer", *IEEE Micro*, No. 3, pp. 62–72, (Jun. 13, 1993).

Wang, W., et al., "Trunk Congestion Control in Heterogeneous Circuit Switched Networks", *IEEE*, pp. 1156–1161.

Wu, M., et al., "Do and Forall: Temporal and Spacial Control Structures", *Procedings, Third Workshop on Compilers for Parallel Computers, ACPG/TR*, Jul. 1992.

Yang, C.S., et al., "Performance Evaluation of Multicast Wormhole Routing in 2D–Torus Multicomputers", *IEEE*, 173–178 (1992).

Yantchev, J., et al., "Adoptive, low latency, deadlock–free packet routing for networks of processors\", *IEEE Proceedings*, 136, 178–186 (May 1989).

Galles, M., "Spider: A High–Speed Network Interconnect", *IEEE Micro*, 34–39, (Jan./Feb. 1997).

Laudon, J., et al., "The SGI Orgin: A ccNUMA Highly Scalable Server", *ISCA*, 1–11, (1997).

ROUTER TABLE LOOKUP MECHANISM

RELATED APPLICATIONS

The present invention is related to the following commonly owned applications filed on even date herewith: a first application entitled "HYBRID HYPERCUBE/TORUS ARCHITECTURE" U.S. patent application Ser. No.: 08/971,588, filed Nov. 17, 1997; and a second application entitled "VIRTUAL CHANNEL ASSIGNMENT IN LARGE TORUS SYSTEMS" U.S. patent application Ser. No.: 08/971,591, filed Nov. 17, 1997. These related applications are herein incorporated by reference.

FIELD OF THE INVENTION

The present invention relates generally to the field of high-speed digital data processing systems, and more particularly, to routers for routing messages in multiprocessor computer systems.

BACKGROUND OF THE INVENTION

Multiprocessor computer systems comprise a number of processing element nodes connected together by an interconnect network. Each processing element node includes at least one processing element. The interconnect network transmits packets of information or messages between processing element nodes. Multiprocessor computer systems having up to hundreds or thousands of processing element nodes are typically referred to as massively parallel processing (MPP) systems. In a typical multiprocessor MPP system, every processing element can directly address all of memory, including the memory of another (remote) processing element, without involving the processor at that processing element. Instead of treating processing element-to-remote-memory communications as an I/O operation, reads or writes to another processing element's memory are accomplished in the same manner as reads or writes to the local memory.

In such multiprocessor MPP systems, the infrastructure that supports communications among the various processors greatly affects the performance of the MPP system because of the level of communications required among processors.

Several different topologies have been proposed to interconnect the various processors in such MPP systems, such as rings, stars, meshes, hypercubes, and torus topologies. Regardless of the topology chosen, design goals include a high communication bandwidth, a low inter-node distance, a high network bisection bandwidth and a high degree of fault tolerance.

Inter-node distance is defined as the number of communications links required to connect one node to another node in the network. Topologies are typically specified in terms of the maximum inter-node distance or network diameter: the shortest distance between two nodes that are farthest apart on the network.

Bisection bandwidth is defined as the number of links that would be severed if the network were to be bisected by a plane at a place where the number of links between the two halves is a minimum. In other words, bisection bandwidth is the number of links connecting two halves of the network where the halves are chosen as the two halves connected by the fewest number of links. It is this worstcase bandwidth which can potentially limit system throughput and cause bottlenecks. Therefore, it is a goal of network topologies to maximize bisection bandwidth.

In a torus topology, a ring is formed in each dimension where information can transfer from one node, through all of the nodes in the same dimension and back to the original node. An n-dimensional torus, when connected, creates a n-dimensional matrix of processing elements. A bi-directional n-dimensional torus topology permits travel in both directions of each dimension of the torus. For example, each processing element node in the 3-dimensional torus has communication links in both the + and − directions of the x, y, and z dimensions. Torus networks offer several advantages for network communication, such as increasing the speed of transferring information. Another advantage of the torus network is the ability to avoid bad communication links by sending information the long way around the network. Furthermore, a toroidal interconnect network is also scalable in all n dimensions, and some or all of the dimensions can be scaled by equal or unequal amounts.

In a conventional hypercube network, a plurality of microprocessors are arranged in an n-dimensional cube where the number of nodes k in the network is equal to $2^n$. In this network, each node is connected to each other node via a plurality of communications paths. The network diameter, the longest communications path from any one node on the network to any other node, is n-links.

Conventional hypercube topology is a very powerful topology that meets many of the system design criteria. However, when used in large systems, the conventional hypercube has some practical limitations. One such limitation is the degree of fanout required for large numbers of processors. As the degree of the hypercube increases, the fanout required for each node increases. As a result, each node becomes costly and requires larger amounts of silicon to implement.

Variations on the basic hypercube topology have been proposed, but each have their own drawbacks, depending on the size of the network. Some of these topologies suffer from a large network diameter, while others suffer from a low bisection bandwidth. What is needed is a topology that is well suited to applications requiring a large number of processors; is scalable; and provides a high bisection bandwidth, a wide communications bandwidth, and a low network diameter.

Moreover, as systems increase the number of processors, the number of physical connections required to support the hypercube topology increases significantly, resulting in higher system costs and manufacturing complexities. Therefore, it is desired that systems could be scaled to take advantage of more than one type of topology so that smaller systems and larger systems having divergent design goals related to topology architecture could be accommodated in one system design. Such design goals include a desire to optimize system performance while attempting to minimize overall system costs and to minimize manufacturing complexities.

Programmable tables have been utilized for routing packets along preferred routes in communication networks to accommodate faults or network reconfiguration. For example, a method of performing distributed programmable routing using programmable routing tables is described in U.S. patent application Ser. No. 08/435,452 entitled "Programmable, Distributed Network Routing," filed on May 5, 1995, now U.S. Pat. No. 5,721,819, and which is herein incorporated by reference. In this application, the router tables are implemented in a hierarchical fashion to more effectively accommodate large networks. The network in this application has a scalable hierarchical topology of two or more levels corresponding to the hierarchical router tables. The first level utilizes conventional n-dimensional hypercube topologies for implementing a multiprocessor infrastructure. Each of the n-dimensional hypercubes are interconnected at a second level which can be one of p dimensions, where p does not have to equal n.

For reasons stated above and for other reasons presented in greater detail in the Description of the Preferred Embodiments section of the present specification, there is a need to for programmable routing tables in routers which permit systems to be scaled to take advantage of more than one type of topology so that smaller systems and larger systems having divergent design goals related to topology architecture could be accommodated in one router design.

SUMMARY OF THE INVENTION

The present invention provides a method and a multiprocessor computer system including a plurality of processing element nodes. Each processing element node has at least one processor and memory. Physical communication links interconnect the processing element nodes in a n-dimensional topology, which includes at least two global partitions of processing element nodes. Routers route messages between the plurality of processing element nodes on the physical communication links. Each router including ports for receiving and sending messages, and lookup tables associated to ports and holding entries having directions for routing from a next router along a given route. Each lookup table includes a local router table having directions for routing between processor element nodes within a global partition, and a global router table having directions for routing between processor element nodes located in different global partitions. The directions from the local table are selected for routing from the next router if the current processing element node is in a destination global partition or if the current processing element node is one plus or minus hop from reaching the destination global partition and the route is exiting on a port that routes to the destination global partition, else the directions from the global router table are selected for routing from the next router.

In one embodiment, each router includes a programmable register having a force local table bit, that, when set, causes the directions from the local table to be selected for routing from the next router. In one embodiment, each router includes programmable registers having a plus global valid bit and a minus global valid bit. The directions from the local table are selected for routing from the next router if the current processing element node is in the destination global partitions or if the current processing element node is one plus hop from reaching the destination global partition and the plus global valid bit is set and the route is exiting on a port that routes to the destination global partition or if the current processing element node is one minus hop from reaching the destination global partition and the minus global valid bit is set and the route is exiting on a port that routes to the destination global partition, else the directions from the global router table are selected for routing from the next router.

In one embodiment, the local table includes local table entries, wherein each local router table entry includes a − global direction field, a + global direction field, and a local direction field. The local direction field is selected for routing from the next router if the current processing element node is in the destination global partitions. The − global direction field is selected for routing from the next router if the current processing element node is one minus hop from reaching the destination global partition and the route is exiting on a port that routes to the destination global partition. The + global direction field is selected for routing from the next router if the current processing element node is one plus hop from reaching the destination global partition and the route is exiting on a port that routes to the destination global partition.

In one embodiment, the topology is a torus topology where at least one of the n dimensions has a radix greater than four. In one embodiment, when the topology is a six or less dimensional hypercube, only the local router table is used to obtain the directions for routing from the next router.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
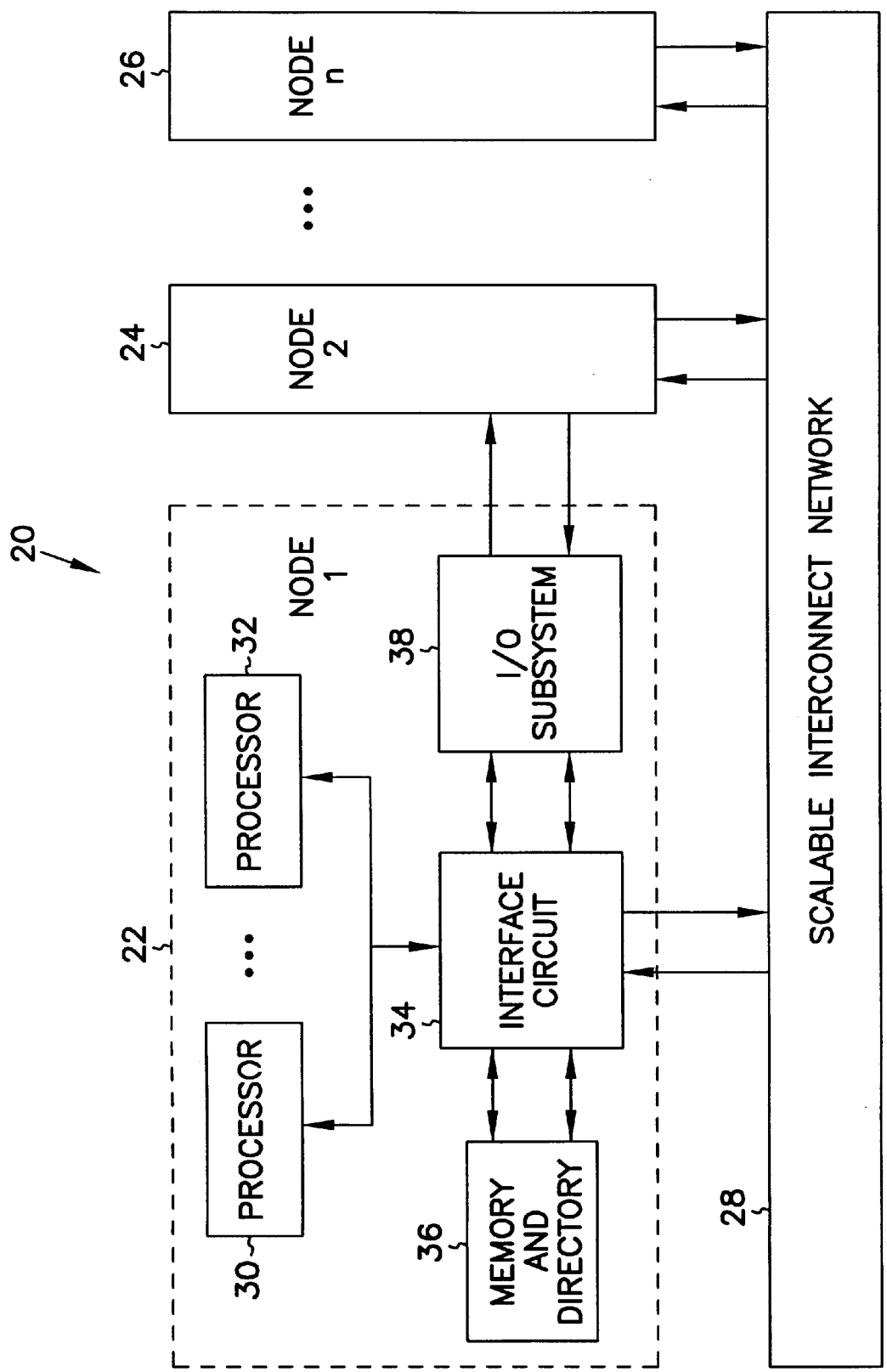
FIG. 1 is block diagram of a multiprocessor computer system.

A representative multiprocessor computer system according to the present invention is indicated generally at 20 in FIG. 1. As indicated in FIG. 1, multiprocessor computer system 20 includes up to n nodes, such as indicated by a first node 22, a second node 24, and an nth node 26. The nodes are interconnected by a scalable interconnect network 28, which permits multiprocessor computer systems 20 to be scale from desk side systems to very large supercomputer configurations.

As illustrated in detail for first node 22, each node in multiprocessor computer system 20 includes at least one processor, such as a first processor 30 and a second processor 32 for node 22. An interface circuit 34 interfaces with scalable interconnect network 28 and communicates with a memory and directory 36 and an input/output crossbar subsystem 38.

Although the multiprocessor computer system 20 illustrated in FIG. 1 provides one example environment to implement the below-described hypercube/torus scalable architecture according to the present invention, the present invention is in no way limited to this particular application environment. In fact, many alternative environments using alternative node and interface circuit configurations can be utilized. To a large extent, the topology according to the present invention, as implemented in scalable interconnect network 28, is independent of the complexity of the nodes, such as nodes 22, 24, and 26, interconnected by that topology.

Figure 2:
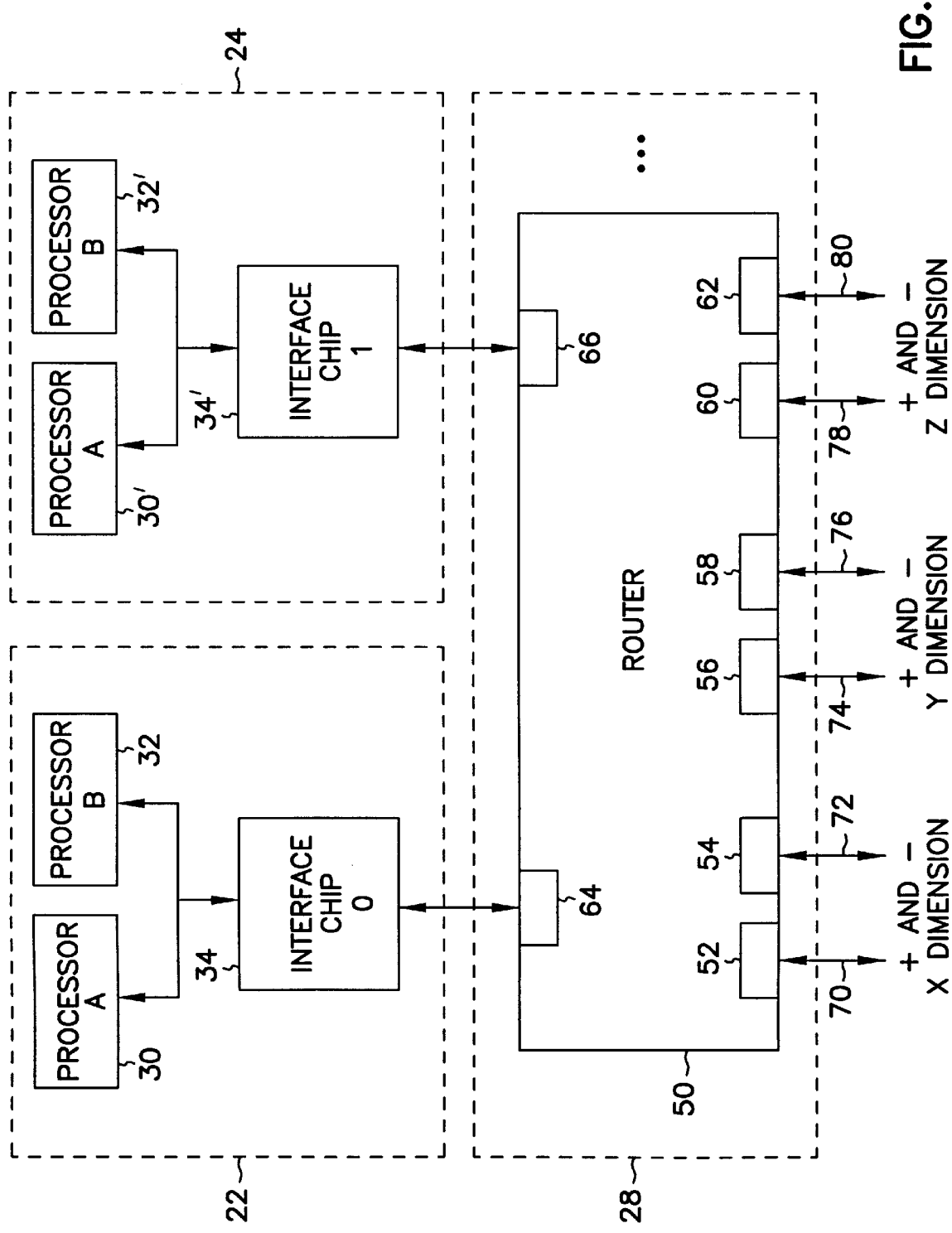
FIG. 2 is a block diagram of one embodiment of the interface between a scalable interconnect network and two nodes, each having two processors.

FIG. 2 illustrates, in block diagram form, one embodiment of the interface between scalable interconnect network 28 and two nodes 22 and 24. In this embodiment, scalable interconnect network 28 includes router chips, such as indicated at 50. Router chip 50 includes eight ports 52, 54, 56, 58, 60, 62, 64 and 66. Router ports 52 and 54 are respectively coupled to +X dimension physical communication link 70 and −X dimension physical communication link 72. Router ports 56 and 58 are respectively coupled to +Y dimension physical communication link 74 and −Y dimension physical communication link 76. Router ports 60 and 62 are respectively coupled to +Z dimension physical communication link 78 and −Z dimension physical communication link 80. Router port 64 communicates with node 22 and router port 66 communicates with node 24.

As indicated, router port 64 communicates with node 22 via interface chip 34. Similarly, router port 66 communicates with node 24 via interface chip 34'. In node 22, interface chip 34 communicates with processors 30 and 32. In node 24, interface chip 34' communicates with processors 30' and 32'.

Therefore, as illustrated in FIG. 2, this implementation of scalable interconnect network 28 transmits packets of information between the processor nodes in the + and − directions of three dimensions and routes packets to two nodes which both include two processors. In other words, one router chip 50 communicates directly with four processors (30, 32, 30' and 32') and six physical communication links (70, 72, 74, 76, 78 and 80).

Figure 3:
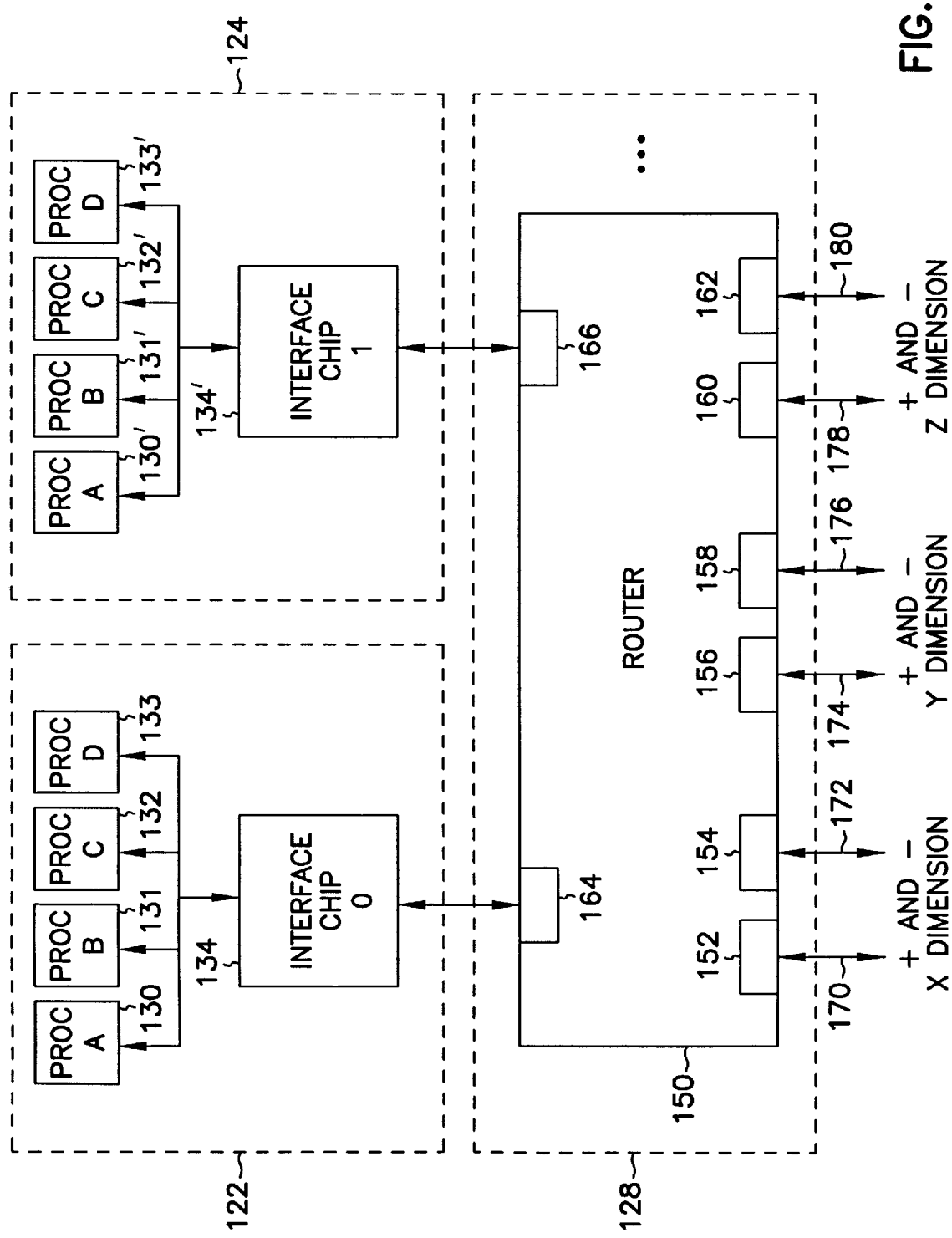
FIG. 3 is a block diagram of one embodiment of the interface between a scalable interconnect network and two nodes, each having four processors.

FIG. 3 illustrates, in block diagram form, another embodiment of the interface between a scalable interconnect network 128 and two nodes 122 and 124. In this embodiment, scalable interconnect network 128 includes router chips, such as indicated at 150. Router chip 150 includes eight ports 152, 154, 156, 158, 160, 162, 164 and 166. Router ports 152 and 154 are respectively coupled to +X dimension physical communication link 170 and −X dimension physical communication link 172. Router ports 156 and 158 are respectively coupled to +Y dimension physical communication link 174 and −Y dimension physical communication link 176. Router ports 160 and 162 are respectively coupled to +Z dimension physical communication link 178 and −Z dimension physical communication link 180. Router port 164 communicates with node 122 and router port 166 communicates with node 124.

As indicated, router port 164 communicates with node 122 via interface chip 134. Similarly, router port 166 communicates with node 124 via interface chip 134'. In node 122, interface chip 134 communicates with processors 130, 131, 132, and 133. In node 124, interface chip 134' communicates with processors 130', 131', 132', and 133'.

Therefore, as illustrated in FIG. 3, this implementation of scalable interconnect network 128 transmits packets of information between the processor nodes in the + and − directions of three dimensions and routes packets to two nodes which both include four processors. In other words, one router chip 50 communicates directly with eight processors (I 30, 131, 132, 133, 130',131', 132', and 133') and six physical communication links (170, 172, 174, 176, 178 and 180).

As will be better understood by the following discussion, the router chips according to the present invention, such as router chips 50 and 150, can easily scale and accommodate various topologies. In the embodiments illustrated in FIGS. 2 and 3 the networks are double bristled in that two nodes are connected to a single router 50/150. In other alternative embodiments, additional ports are added to the router chip to permit additional bristling of nodes or the adding of additional dimensions. For example, if two additional ports were added to make a total of ten router ports, + and − directions of a fourth dimension could be added to the interconnect network. Alternatively, the two additional ports could be used to make a quadruple bristled network where four nodes are connected to a single router. In addition, other modification can be made, such as implementing a single bristled network where only one node is connected to a single router. For example in eight-port router chip 50 having a single bristled implementation, there could be the + and − directions for the X, Y and Z dimension for connecting a torus, plus an additional single direction fourth dimension for connecting a mesh network. In addition, as illustrated in detail below, the eight router ports of router 50 can be used to create up to six-dimensional hypercube topologies.

Example Hypercube Topologies

Multiprocessor computer system 20 employs eight-port router 50 to form up to six-dimensional hypercube systems. The hypercube topology minimizes average hop counts, provides physical link redundancy and maintains linear bisection bandwidth salability.

Figure 4:
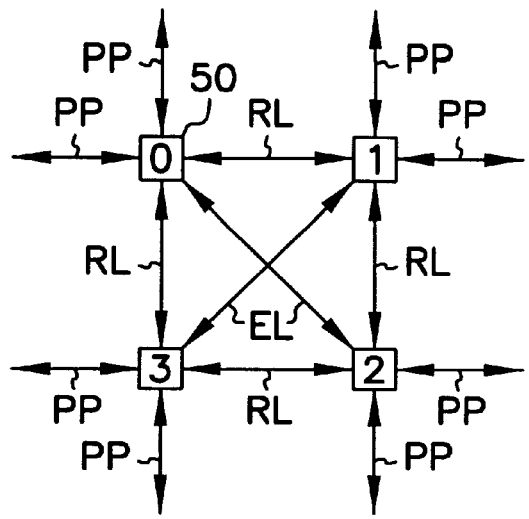
FIG. 4 is a model of a two dimensional (2D) hypercube topology multiprocessor system.

An example two dimensional (2D) hypercube topology multiprocessor system is modeled in FIG. 4. In FIG. 4, four router chips 50 are employed and are numbered 0 through 3. There are two processor ports from each router, such as those labeled PP from router 0, to couple each router to two nodes to create a double bristled topology. Thus, the doubled bristled 2D topology produces an eight node multiprocessor system having 16 processors in a two processor per node system or 32 processors in a four processor per node system. The router links, such as those labeled RL from node 0 to nodes 1 and 3, form the 2D hypercube topology. In addition, extra ports of each router are used to form express links, such as those labeled EL from node 0 to node 2, resulting in a doubling of the bisection bandwidth of the system.

Figure 5:
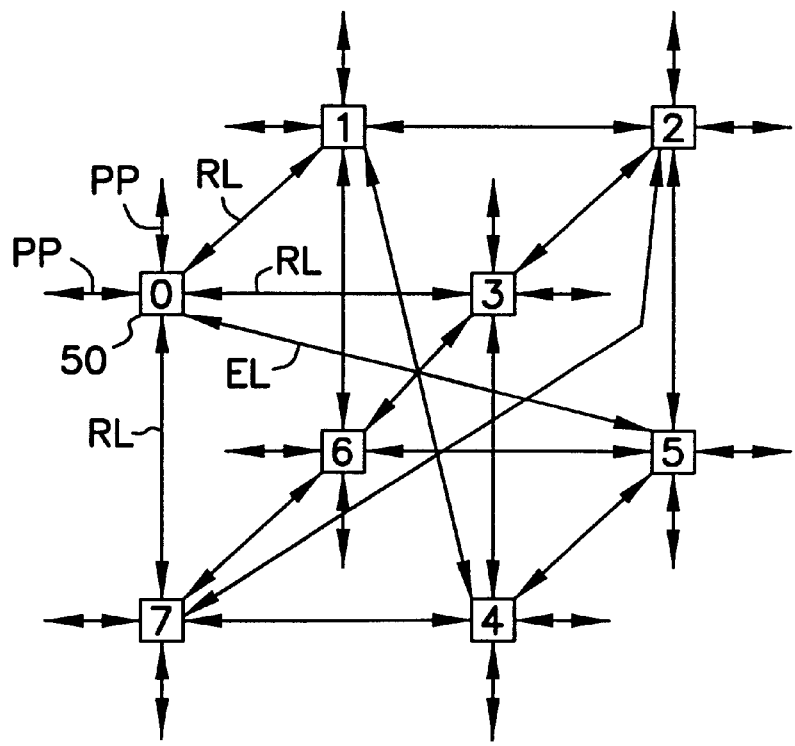
FIG. 5 is a model of a three dimensional (3D) hypercube topology multiprocessor system.

An example three dimensional (3D) hypercube topology multiprocessor system is modeled in FIG. 5. In FIG. 5, eight router chips 50 are employed and are numbered 0 through 7. There are two processor ports from each router, such as those labeled PP from router 0, to couple each router to two nodes to create a double bristled topology. Thus, the doubled bristled 3D topology produces an 16 node multprocessor system having 32 processors in a two processor per node system or 64 processors in a four processor per node system. The router links, such as those labeled RL from node 0 to nodes 1, 3, and 7 form the 3D hypercube topology. In addition, extra ports of each router are used to form express links, such as those labeled EL from node 0 to node 5, resulting in a doubling of the bisection bandwidth of the system.

Figure 6:
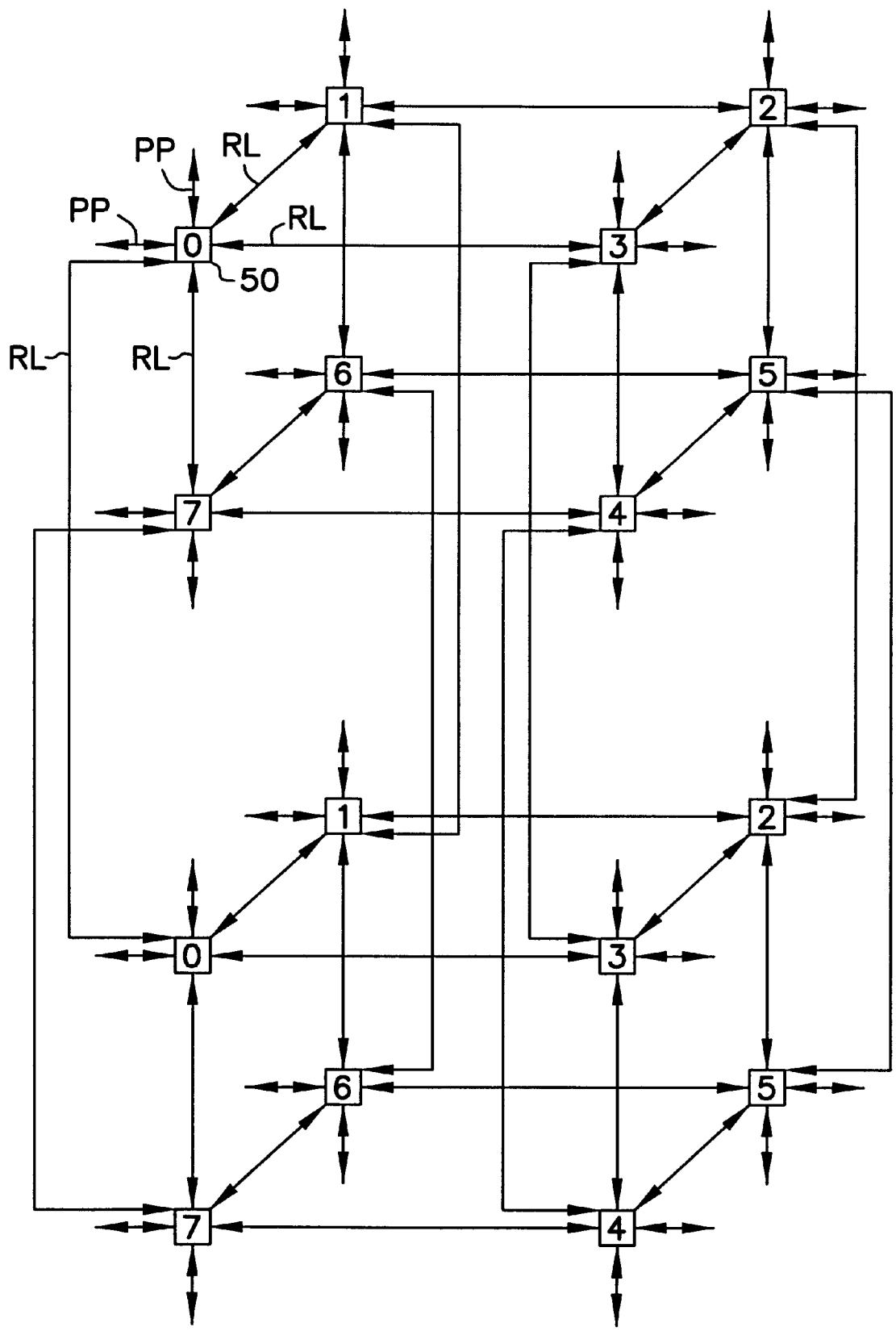
FIG. 6 is a model of a four dimensional (4D) hypercube topology multiprocessor system.

An example four dimensional (4D) hypercube topology multiprocessor system is modeled in FIG. 6. In FIG. 6, 16 router chips 50 are employed. There are two processor ports from each router, such as those labeled PP from router 0, to couple each router to two nodes to create a double bristled topology. Thus, the doubled bristled 4D topology produces a 32 node multprocessor system having 64 processors in a two processor per node system or 128 processors in a four processor per node system. The router links, such as those labeled RL from node 0 form the 4D hypercube topology.

Figure 7:
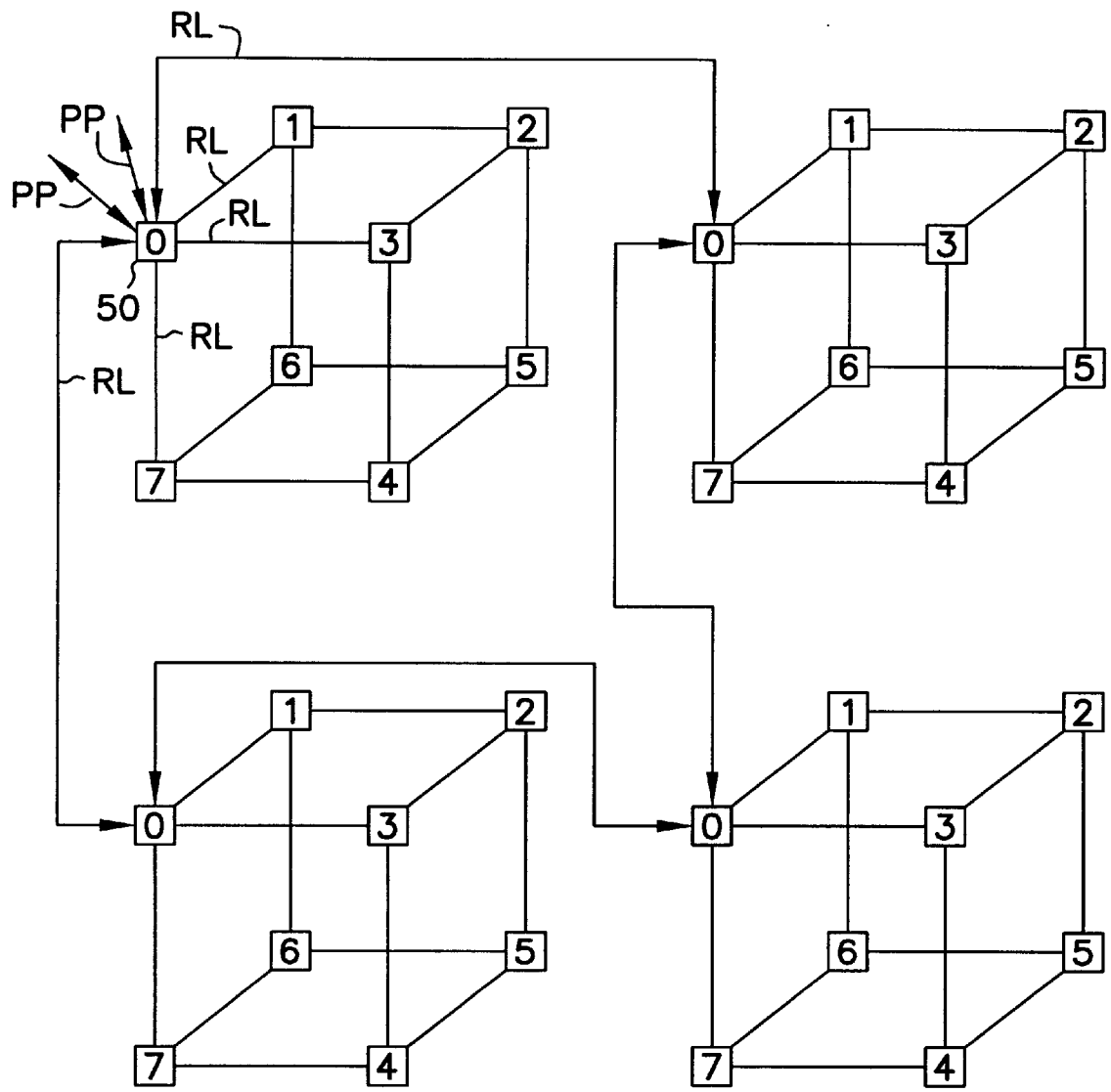
FIG. 7 is a model of a five dimensional (5D) hypercube topology multiprocessor system.

An example five dimensional (5D) hypercube topology multiprocessor system is modeled in FIG. 7. In FIG. 7, 32 router chips 50 are employed. There are two processor ports from each router, such as those labeled PP from router 0, to couple each router to two nodes to create a double bristled topology. Thus, the doubled bristled 5D topology produces a 64 node multprocessor system having 128 processors in a two processor per node system or 256 processors in a four processor per node system. The router links, such as those labeled RL from node 0 form the 5D hypercube topology. For clarity, only the node 0 links in the fourth and fifth dimensions are shown in FIG. 7.

Figure 8:
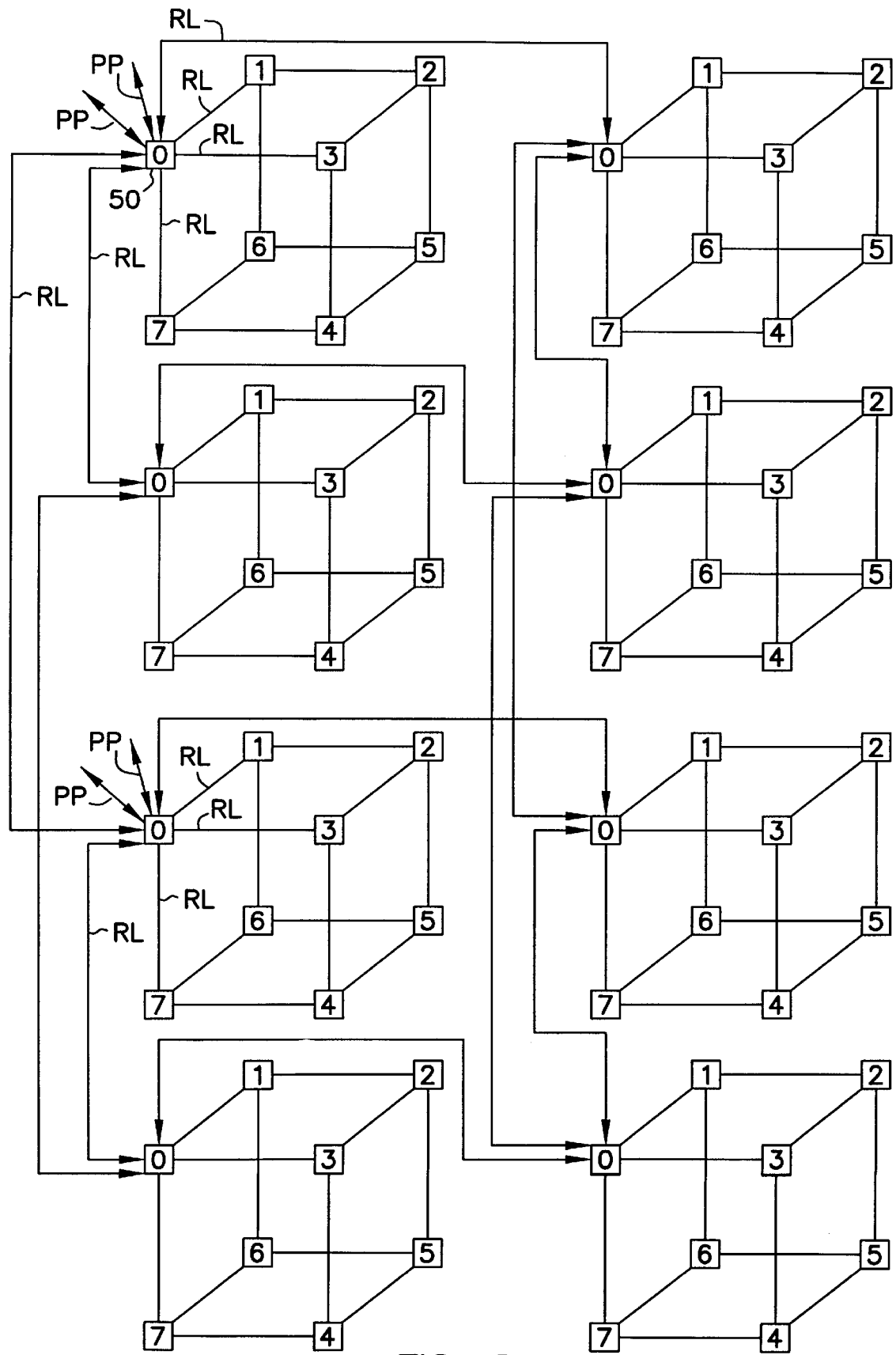
FIG. 8 is a model of a six dimensional (6D) hypercube topology multiprocessor system.

An example six dimensional (6D) hypercube topology multiprocessor system is modeled in FIG. 8. In FIG. 8, 64 router chips 50 are employed. There are two processor ports from each router, such as those labeled PP from router 0, to couple each router to two nodes to create a double bristled topology. Thus, the doubled bristled 6D topology produces a 128 node multprocessor system having 256 processors in a two processor per node system or 512 processors in a four processor per node system. The router links, such as those labeled RL from node 0 form the 6D hypercube topology. For clarity, only the node 0 links in the fourth, fifth, and sixth dimensions are shown in FIG. 7.

Torus Topologies for Larger System Configurations

Multiprocessor computer system 20 scales from desk size systems to very large super computer configurations. Scalable interconnect network 28 connects multiple nodes via a very high speed, reliable interconnect system. Eight port router 50 can be employed to scale systems beyond 128 nodes in three dimensional (3D) torus topologies. Non-power-of-two systems can also be configured simply by adding additional cables and reconfiguring routing tables as described below. The below description describes example large scale system configurations and the corresponding system topologies for example systems from 128 to 2048 nodes. Router 50 preferable uses differential signaling to enhance its ability to scale as system sizes grow. As with the multiprocessor topologies described above, two of the eight ports are typically dedicated to connecting from the routers to two separate nodes, such as indicated in FIGS. 2 and 3. Also as illustrated in FIGS. 2 and 3, the six remaining ports are employed to form + and − direction connections in three dimensions (X, Y, and Z).

Figure 9:
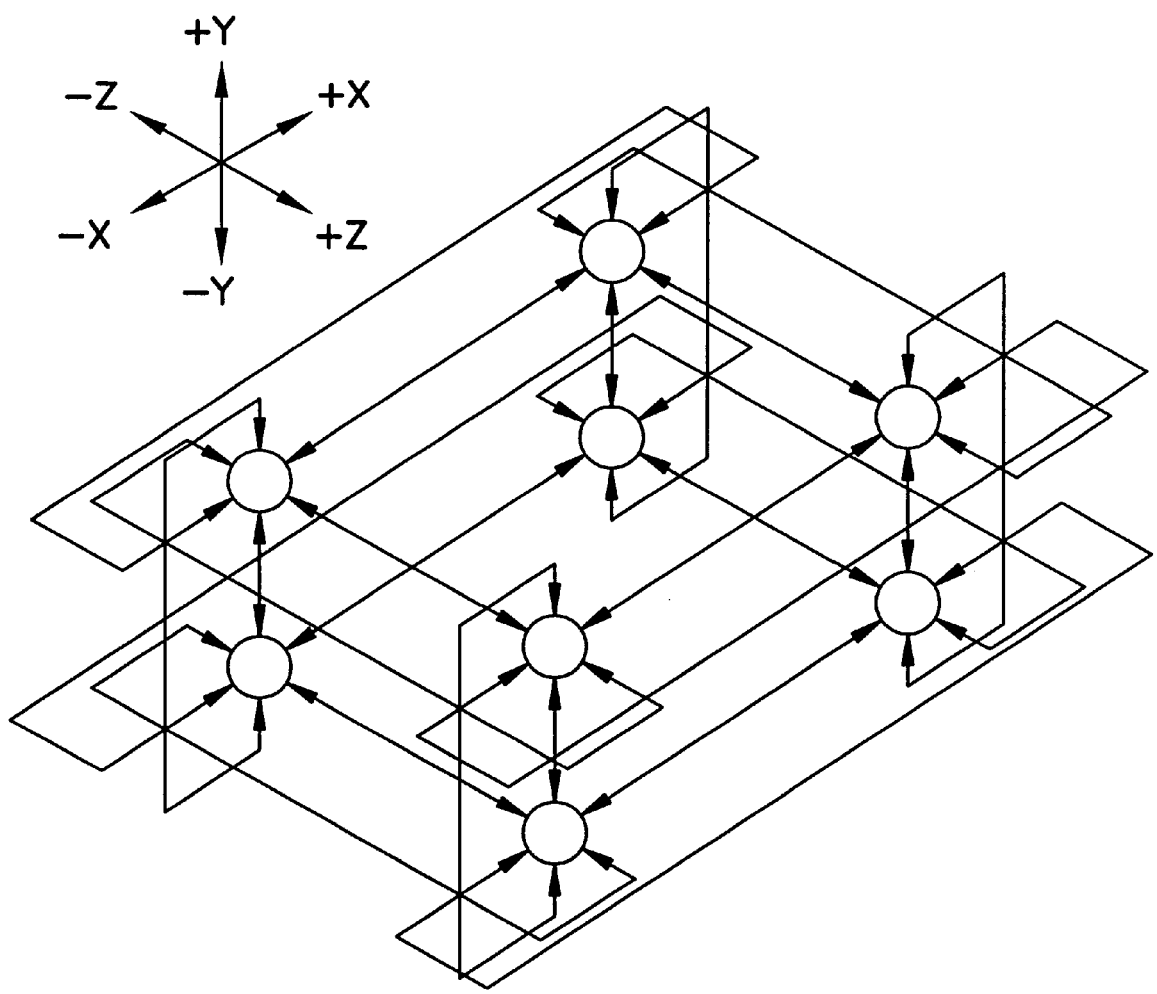
FIG. 9 is a diagram of a 2×2×2 three dimensional (3D) torus topology.

For illustrative purposes, FIG. 9 illustrates a 2×2×2 3D torus topology network in the X, Y, and Z dimensions. Each node in a 3D torus has communication links in both the + and − directions of the X, Y and Z dimensions. A tours topology forms a ring each dimension where information can transfer from one node, through all the nodes in the same dimension, and back to the origin node.

It is interesting to note that a 4×4×4 bidirectional 3D torus topology is equivalent to the 6D multiprocessor topology illustrated in FIG. 8 having 128 nodes. Thus, as indicated above, the 3D torus topology is utilized for systems having more than 128 nodes, because a double bristled 60 multiprocessor contains 128 nodes.

Global Partitions

As discussed below, each port on router 50 has two router tables (shown in FIGS. 18 and 19) referred to as a local router table and a global router table. In one embodiment of multiprocessor computer system 20 which is scalable to 2048 nodes, the local router table contains 128 locations and the global router table contains 16 locations. If a packet's source processor is in the same global partition as the destination processor, local tables will describe all of the routes required for the requests to reach their destination and for the response to return to the source. If the destination is in a different global partition, the global tables are used to describe how to get from one partition to the next. As is described below, because the router tables indicate which output port to take on the next router chip, the router chips which are one hop from the destination global partition also use the local table.

Example X Dimension Configuration

Figure 10:
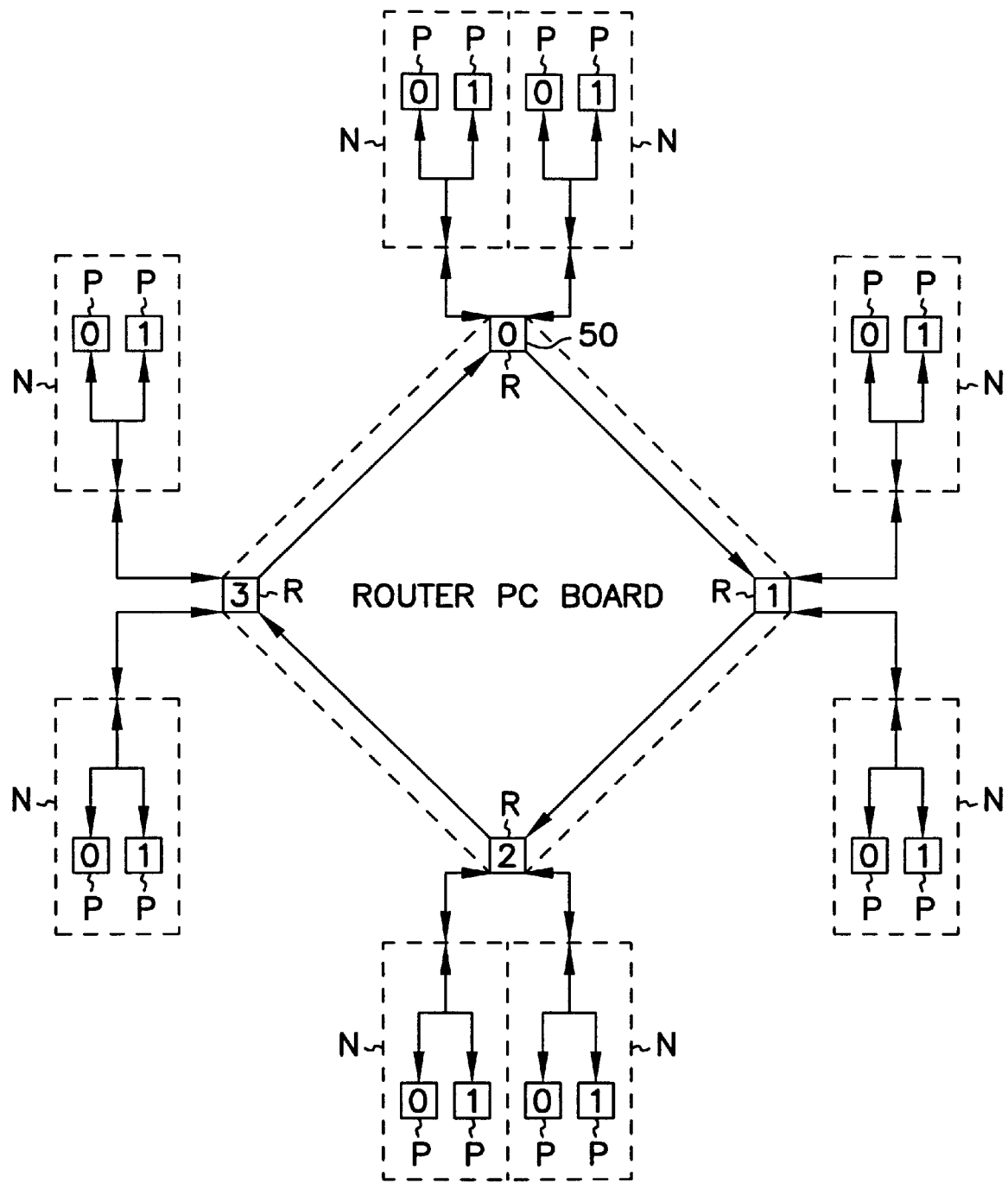
FIG. 10 is a diagram of an example X dimension configuration for one embodiment of a multiprocessor computer system.

An example X dimension configuration for one embodiment of multiprocessor computer system 20 is illustrated in FIG. 10. A router PC board 86 includes four routers, such as router 50, which are labeled R and numbered 0, 1, 2 and 3. In this configuration, the X dimension does not scale as system sizes grow. In this implementation, the X dimension connections are implied in all system topologies greater than 128 nodes. Each of the four routers 50 on router PC board 86 is coupled to two nodes which are labeled N. Each node in the embodiment illustrated in FIG. 10 comprises two processors labeled P.

In this embodiment, four routers are connected on the router PC board 86 to form a torus connection of four routers in the X-dimension. The X-dimension does not scale beyond four connections. The four remaining ports of each router chip 50 are connected between router chips to form the Y and Z dimensions for the torus topologies used in larger systems.

Example Torus Topologies

Figure 11:
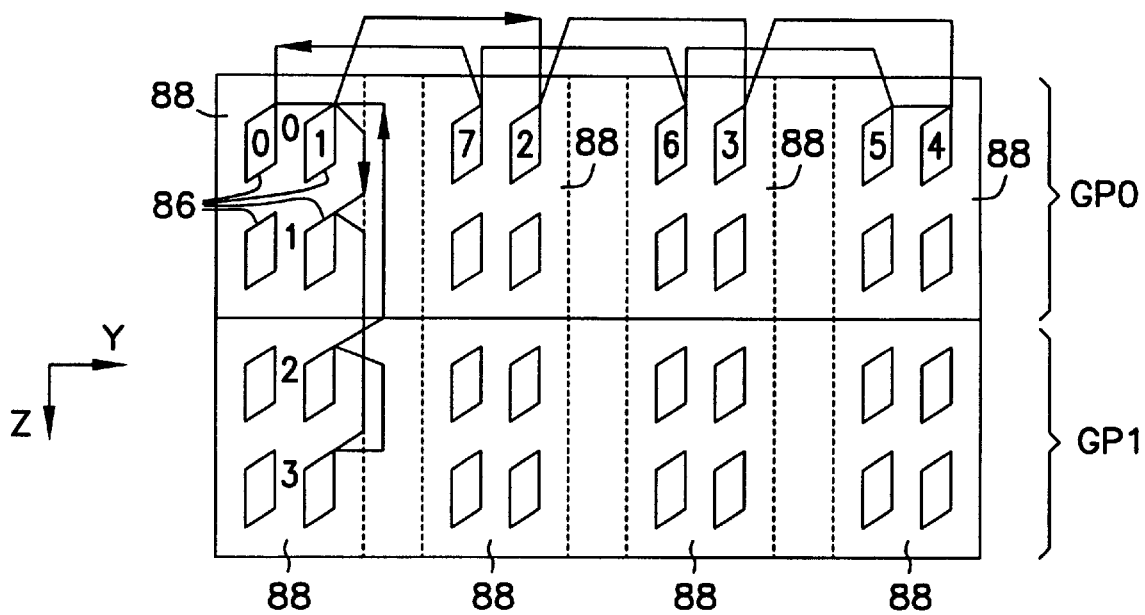
FIG. 11 is a physical layout diagram for one embodiment of a multiprocessor computer system having 256 nodes.

FIG. 11 illustrates one embodiment of a system having 256 nodes interconnected with 128 router chips 50 in a double bristled torus topology. In this embodiment there are four X dimension PC router boards 86 in each of eight cabinets 88. Thus, in this embodiment, there are eight nodes coupled to each X dimension router board 86 and 32 nodes within each cabinet 88. The + directions of the Y and Z dimensions are indicated with arrows. As indicated, there are four locations within the X dimensions, eight locations within the Y dimension, and four locations within the Z dimension resulting in a 4×8×4 torus topology. Also, as illustrated in FIG. 11, there is a global partition GP0 and a global partition GP1, where each global partition comprises four cabinets 88.

Figure 12:
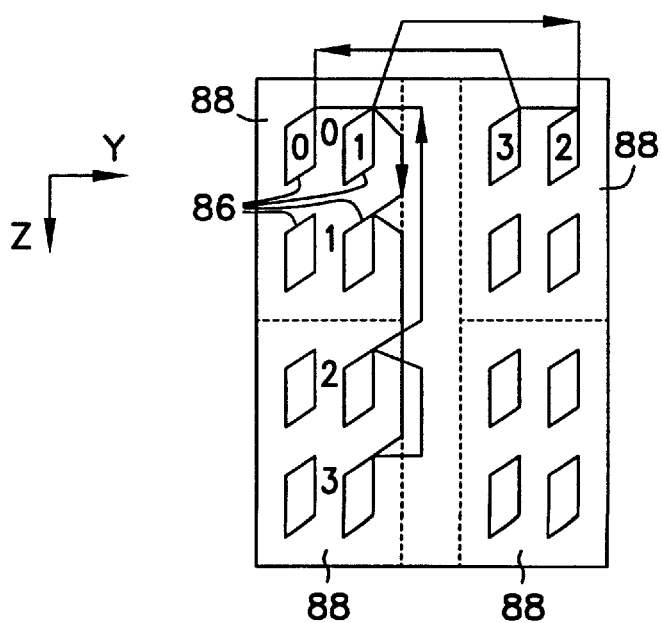
FIG. 12 is a physical layout diagram for one embodiment of a multiprocessor computer system having 128 nodes.

FIG. 12 illustrates one embodiment of a system having 128 nodes interconnected with 64 router chips 50 in a double bristled torus topology. In this embodiment there are four X dimension PC router boards 86 in each of four cabinets 88. Thus, in this embodiment, there are eight nodes coupled to each X dimension router board 86 and 32 nodes within each cabinet 88. The + directions of the Y and Z dimensions are indicated with arrows. As indicated, there are four locations within the X dimensions, four locations within the Y dimension, and four locations within the Z dimension resulting in a 4×4×4 torus topology. There is only one global partition in the embodiment of FIG. 12 having four cabinets 88. This 4×4×4 torus topology is equivalent to the 6D hypercube topology illustrated in FIG. 8.

Figure 13:
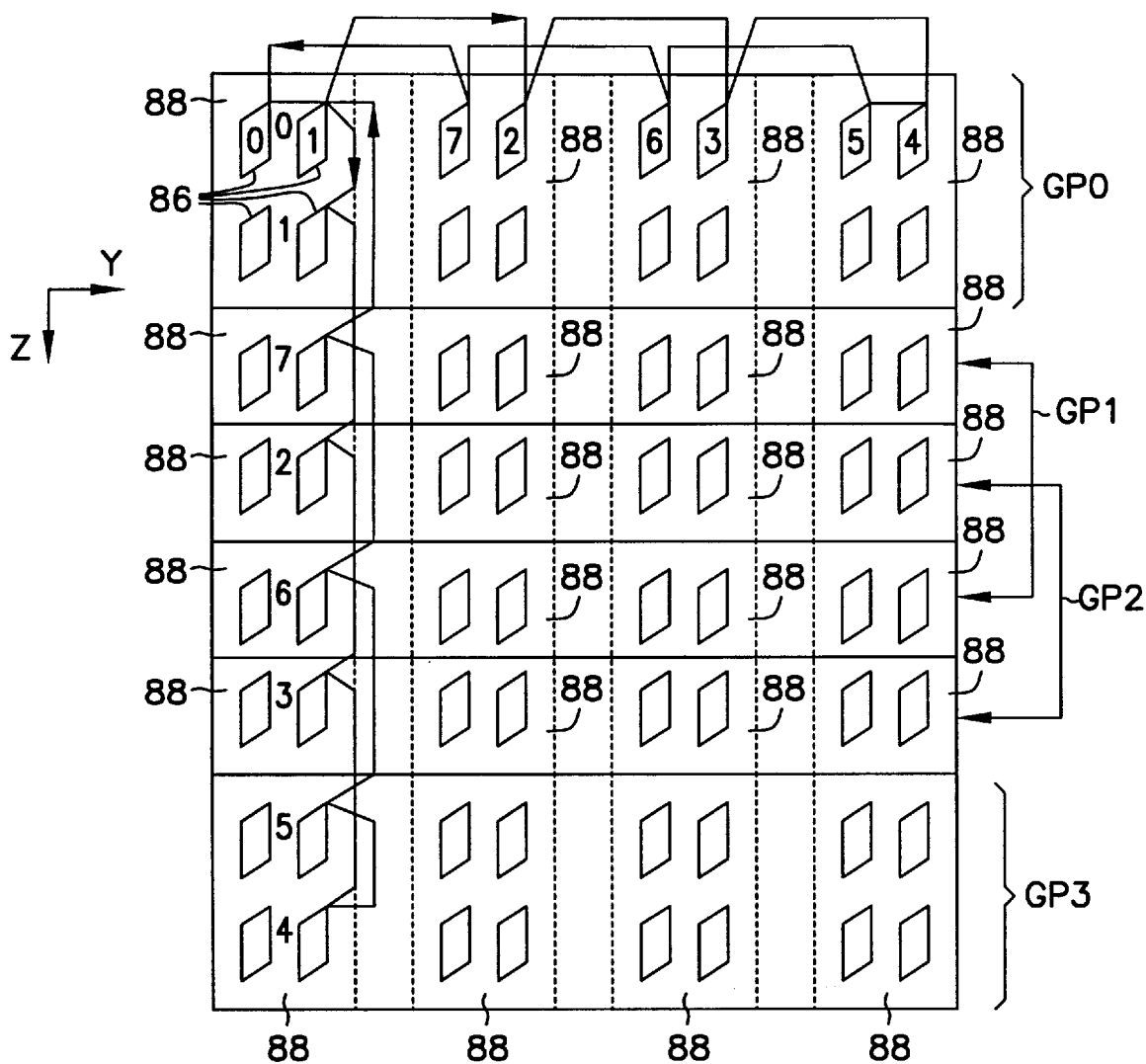
FIG. 13 is a physical layout diagram for one embodiment of a multiprocessor computer system having 512 nodes.

FIG. 13 illustrates one embodiment of a system having 512 nodes interconnected with 256 router chips 50 in a double bristled torus topology. In this embodiment there are four X dimension PC router boards 86 in each of 16 cabinets 88. Thus, in this embodiment, there are eight nodes coupled to each X dimension router board 86 and 32 nodes within each cabinet 88. The + directions of the Y and Z dimensions are indicated with arrows. As indicated, there are four locations within the X dimensions, eight locations within the Y dimension, and eight locations within the Z dimension resulting in a 4×8×8 torus topology. Also, as illustrated in FIG. 13, there are global partitions GP0 through GP3. In this embodiment, global partitions GP0 and GP3 each comprise four cabinets 88, while global partitions GP2 and GP3 are interleaved within a total of eight cabinets.

Figure 14:
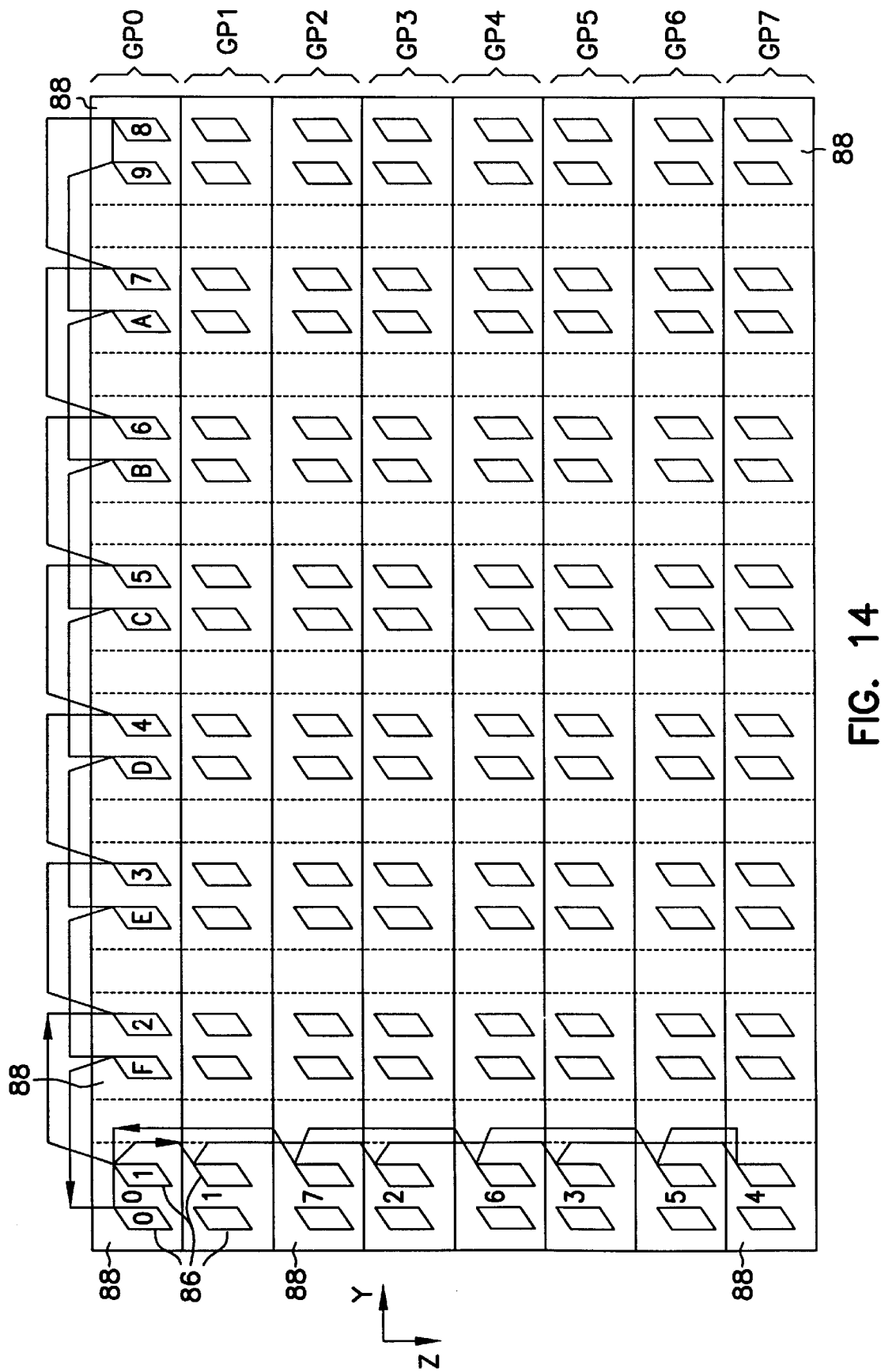
FIG. 14 is a physical layout diagram for one embodiment of a multiprocessor computer system having 1024 nodes.

FIG. 14 illustrates one embodiment of a system having 1024 nodes interconnected with 512 router chips 50 in a double bristled torus topology. In this embodiment there are four X dimension PC router boards 86 in each of 32 cabinets 88. Thus, in this embodiment, there are eight nodes coupled to each X dimension router board 86 and 32 nodes within each cabinet 88. The + directions of the Y and Z dimensions are indicated with arrows. As indicated, there are four locations within the X dimensions, 16 locations within the Y dimension, and eight locations within the Z dimension resulting in a 4×16×8 torus topology. Also, as illustrated in FIG. 14, there are global partitions GP0 through GP7, where each global partition comprises eight half portions of cabinets 88.

Figure 15:
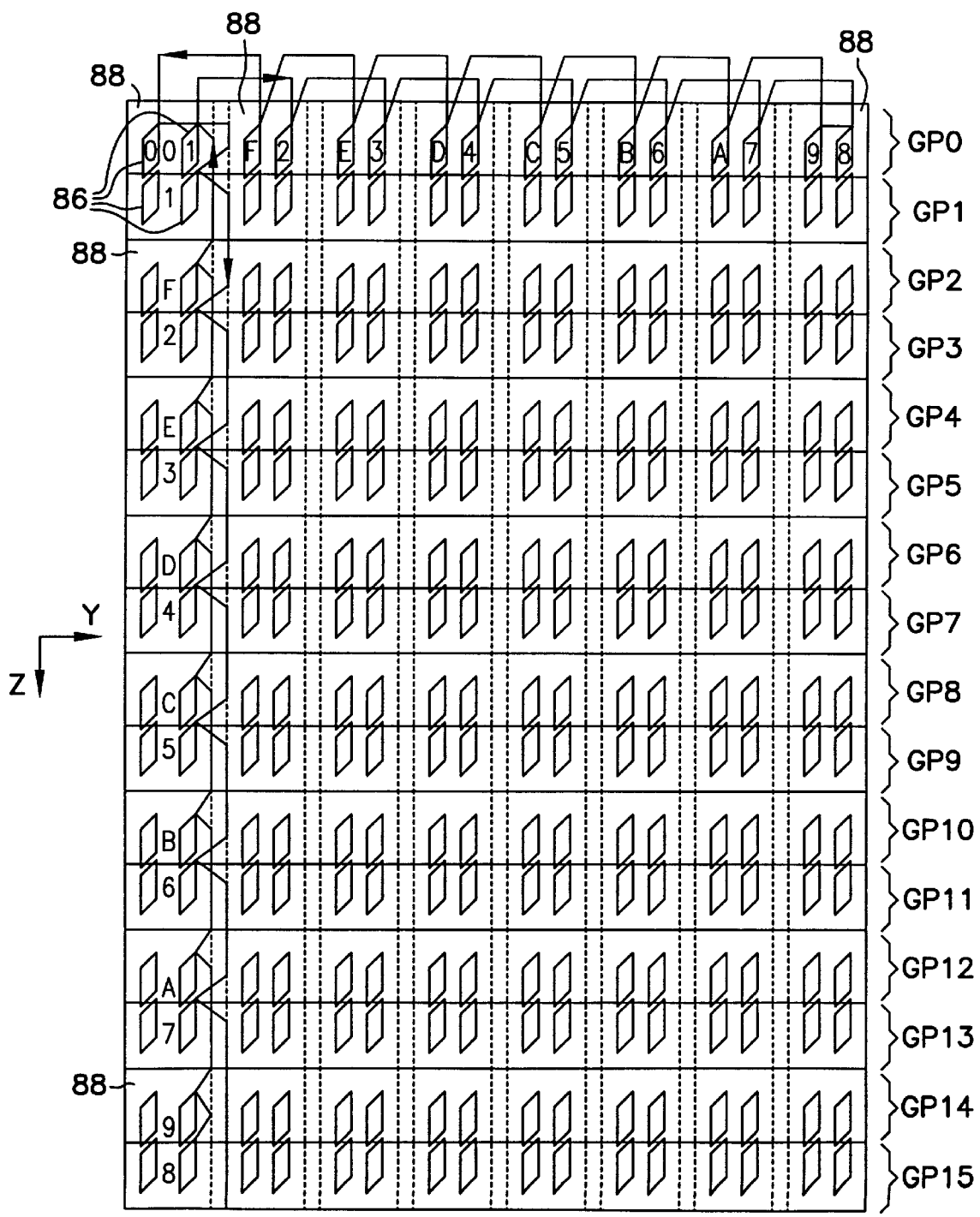
FIG. 15 is a physical layout diagram for one embodiment of a multiprocessor computer system having 2048 nodes.

FIG. 15 illustrates one embodiment of a system having 2048 nodes interconnected with 1024 router chips 50 in a double bristled torus topology. In this embodiment there are four X dimension PC router boards 86 in each of 32 cabinets 88. Thus, in this embodiment, there are eight nodes coupled to each X dimension router board 86 and 32 nodes within each cabinet 88. The + directions of the Y and Z dimensions are indicated with arrows. As indicated, there are four locations within the X dimensions, 16 locations within the Y dimension, and 16 locations within the Z dimension resulting in a 4×16×16 torus topology. Also, as illustrated in FIG. 15, there are global partitions GP0 through GP15, where each global partition comprises eight half portions of cabinets 88.

Figure 16:
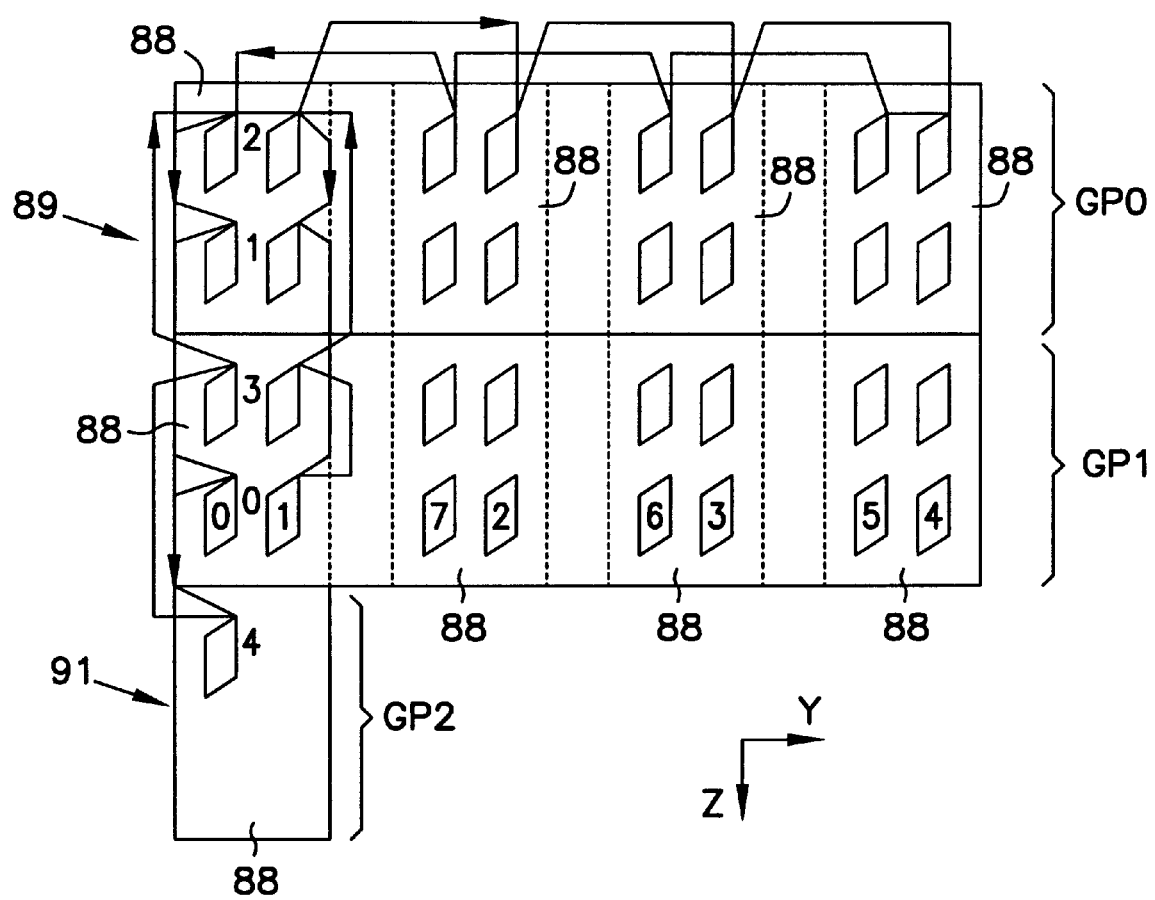
FIG. 16 is a physical layout diagram for one embodiment of a multiprocessor computer system having 264 nodes.

FIGS. 11 through 15 illustrate power-of-two systems. However, as systems scale and size according to the present invention, the systems are not limited to power-of-two configurations. For example, FIG. 16 illustrates one embodiment of a 264 node system comprising a first portion 89 which is 4×4×8 torus within eight cabinets, and a second portion 91 which is 4×1×1 torus within one cabinet. The 264 node system of FIG. 16 comprises global partitions GP0, GP1, and GP3. Global partitions GP0 and GP1 each include four cabinets 88 with 32 nodes within each cabinet. Global partition GP3 includes one cabinet 88, which has 8 nodes.

Figure 17:
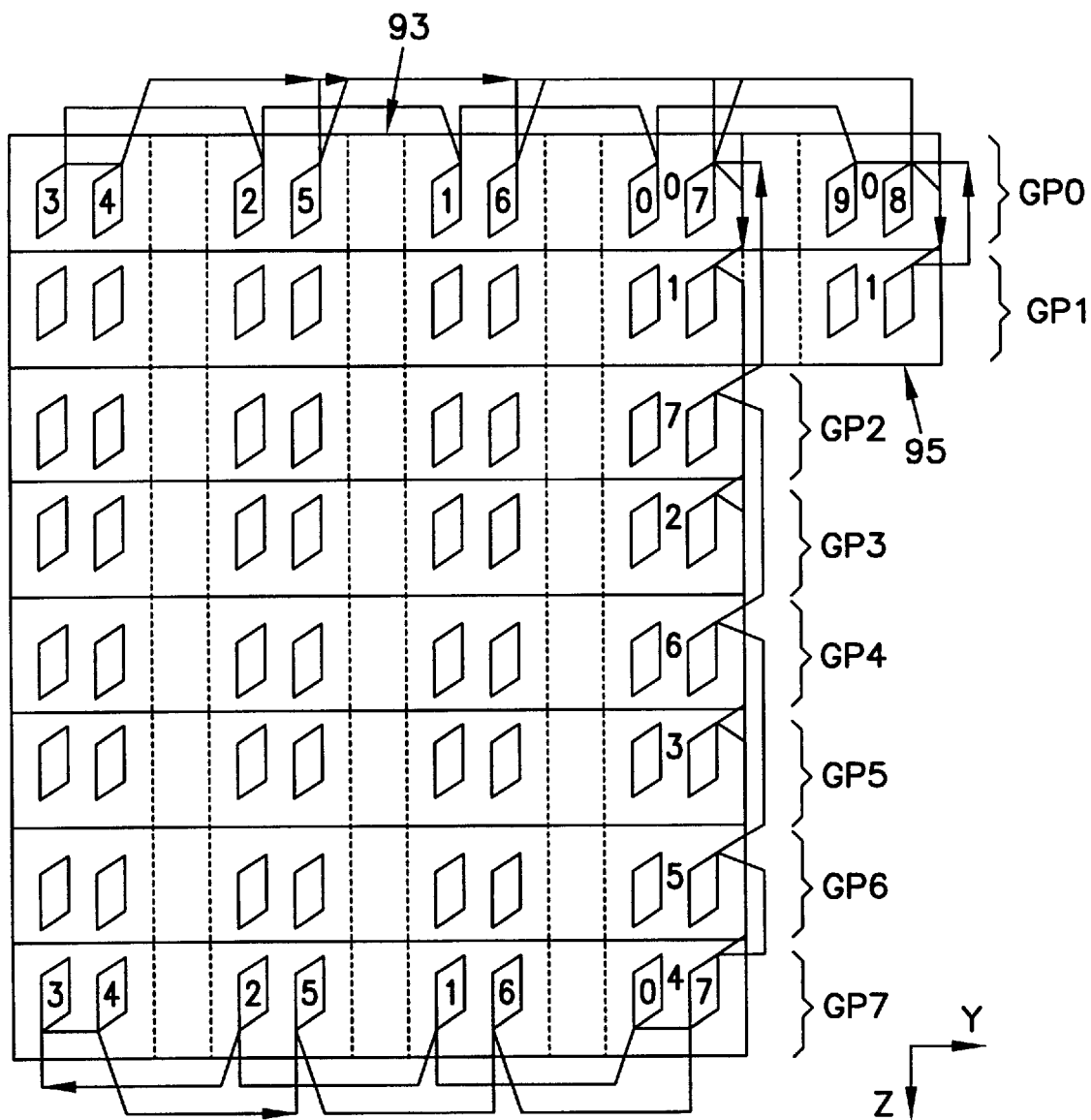
FIG. 17 is a physical layout diagram for one embodiment of a multiprocessor computer system having 544 nodes.

Another example of a non-power of system having 544 nodes is illustrated in FIG. 17. This 544 node system comprises a first portion 93 which is 4×8×8 torus within 16 cabinets, and a second portion 95 which is a 4×2×2 torus within one cabinet. The 544 node system of FIG. 17 comprises global partitions GP0 through GP7. Global partitions GP0 and GP1 each include five half portions of cabinets 88, while GP2 through GP7 each include four half portions of cabinets 88.

Router Chip

Figure 18:
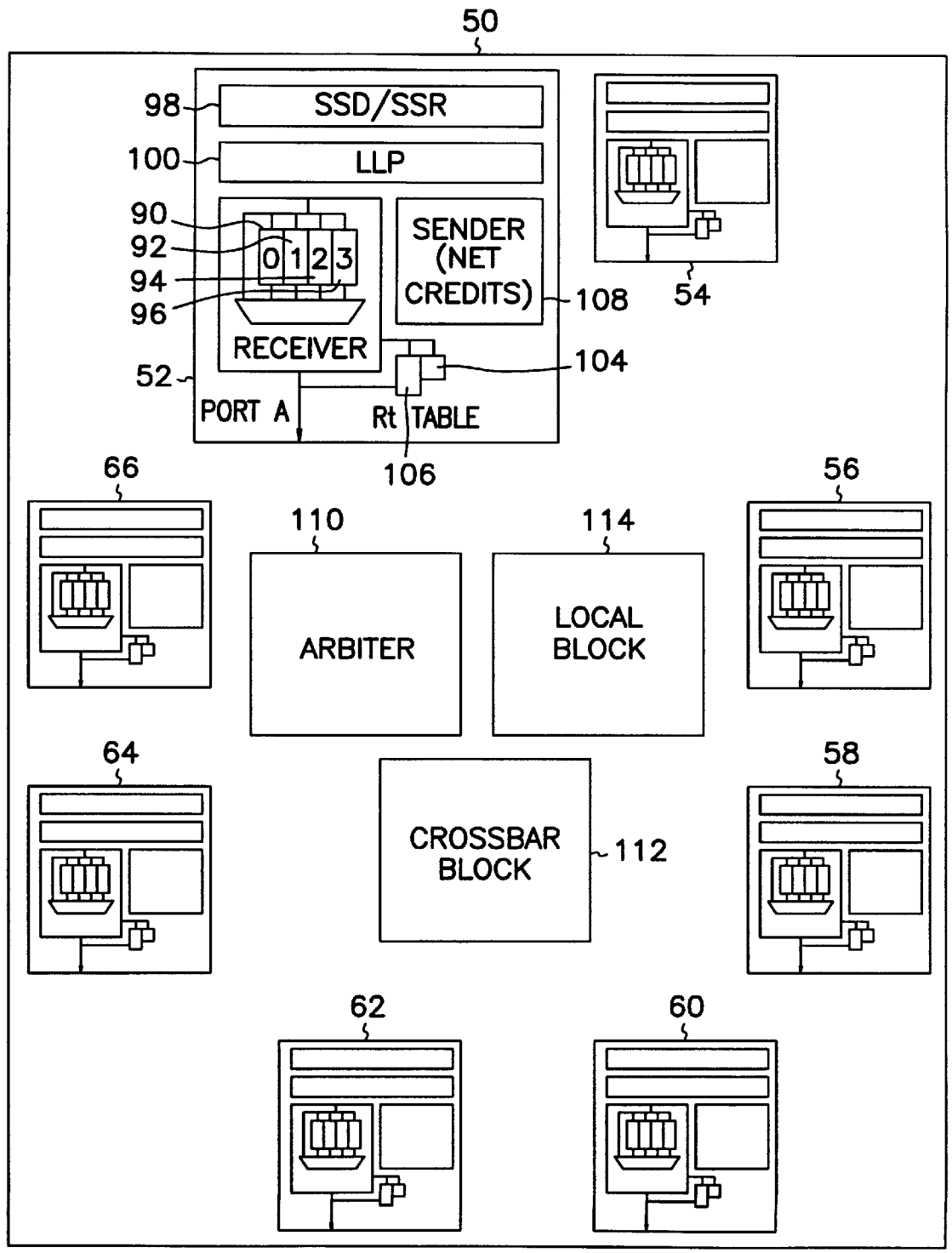
FIG. 18 is a block diagram of a router chip according to the present invention.
Figure 19:
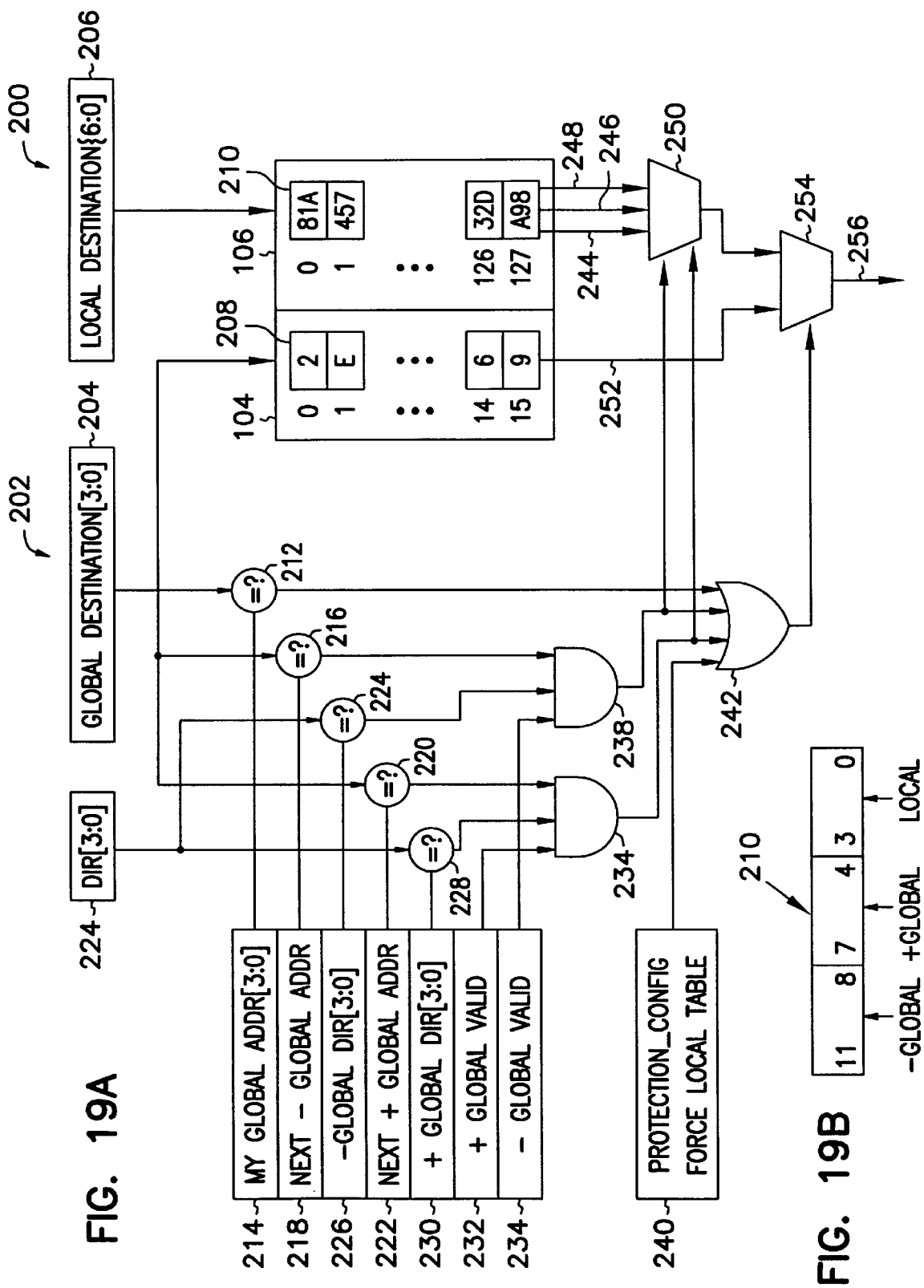
FIG. 19A is a diagram of a router table lookup mechanism according to the present invention.
FIG. 19B is a diagram of an example entry for a local router table employed in the router lookup mechanism of FIG. 19A.

Router chip 50 (or 150) according to the present invention is illustrated in block diagram form in FIG. 18. Router chip 50 includes eight differential ports 52, 54, 56, 58, 60, 62, 64, and 66 for coupling to up to eight pairs of unidirectional physical links per router. Four virtual channels, such as indicated at 90, 92, 94, and 96 for port 52, are assigned to each physical channel, where two virtual channels are assigned to requests and two virtual channels are assigned to responses. A more detailed discussion of virtual channels is provided below.

A source synchronous driver/receiver (SSD/SSR) block 98 creates and interprets high-speed, source synchronous signals used for inter-chip communication. A link level protocol (LLP) block 100 interfaces to SSD/SSR block 98 and provides transmission of data between router chips. A router receive block 102 accepts data from LLP block 100, manages virtual channels, and forwards data to router tables 104 and 106 and a router send block 108. Router receive block 102 includes virtual channel management logic, dynamically allocated memory queues, bypass logic, and fairness logic which ages packets when they fail to make progress. Router send block 108 drives data into LLP block 102 for transmission to other router chips.

Global router table 104 and local router table 106 together form a two level routing table which provides routing information for messages as they pass through the network. Router tables 104 and 106 are indexed by the message destination and direction, and provide a new message direction via an exit port ID. Since routing is pipelined with link arbitration, the routing tables must include instructions as to how to traverse to the next router chip.

For clarity, only port 52 is shown in detail, but all of the eight ports of router chip 50 comprise: virtual channels 90, 92, 94, and 96 a source synchronous driver/receiver (SSD/SSR) block 98; a link level protocol (LLP) block 100; a router receive block 102 ; router tables 104 and 106; and a router send block 108.

A router arbiter block 110 executes two levels of arbitration for the router chip. The first level arbiter performs a wavefront arbitration to selects a near-optimal combination of grants for a given arbitration cycle and informs receiver block 102 which requests won. Ports which are not used during the first level arbitration have a second chance to be granted by the second level or bypass arbiter. Fairness via age comparison is contained within the arbiter block.

A router crossbar block 112 includes a series of multiplexers which control data flow from receiver ports to sender ports. Once arbiter block 110 decides on the winners, arbiter block 1 10 forwards this information to crossbar block 112 which provides connections from receivers to senders. A router local block 114 is a control point of router chip 50. Router local block 114 provides access to all router controls and status registers including router tables 104 and 106, error registers (not shown), and protection registers (not shown). Router local block 114 also supports special vector message routing, which is used during system configuration. In one embodiment, router local block also supports hardware barrier operation. Such hardware barrier operations are described in detail in the copending patent application entitled "SERIALIZED, RACE-FREE VIRTUAL BARRIER NETWORK," filed on even date herewith, and which is herein incorporated by reference.

Message Flow

Messages vary from one to several micropackets in length. Router chip 50 does not assume any particular message length based on header information, but routes a message according to header information until a tail bit is detected. The message header contains all routing and priority information required to complete the message route. Several other fields in the message header are used for memory, processor, and I/O operations. However, only a few fields are decoded by router chip 50. The remaining fields are passed along unchanged as data. Network and node operations are separated as much as possible to permit future networks or future nodes to be interchanged with minimal compatibility problems.

Message header packets follow tail micropackets. Once a micropacket is detected by router chip 50 with its tail bit set in a sideband (discussed below), the next micropacket to the same virtual channel is assumed to be a header. After reset, the first micropacket received by router chip 50 is assumed to be a header. Message body packets are treated as all data, except for sideband information.

A sideband is a field of information that accompanies each micropacket. In one embodiment, router 50 employs the sideband to tag each micropacket with a virtual channel, to communicate virtual channel credits, and to indicate error and tail conditions. Error bit encoding indicates that the micropacket accompanying the error bit indicator encountered a memory ECC error or other type of source error. It is necessary to encode the bit error for every micropacket because, for example, an error might not be detected until the end of a block read and the header of a message will already be routed through the network and cannot indicate an error state.

Message Aging

In one embodiment, each message has an age associated with it and message age influences internal arbitration in router chip 50, where priority is given to older messages. Thus, as a message travels across the network, it ages each time it is stored in a virtual channel buffer. The longer a message waits in a virtual channel buffer, the more it ages. The aging process will continue until the aging limit is reached. In one embodiment, the upper age values are reserved for fixed high priority packets.

Message Routing

In one embodiment, routing chip 50 supports two types of routing which are: 1) table-driven routing for standard, high-speed routing based on internal routing tables; and 2) vector routing for initialization, based on routing instructions included in the message header. Table-driven routing messages are injected into the network with a destination address and an initial direction (i.e., exit port ID), and the routing tables contain the information necessary to deliver the message to its destination. Vector routing requires the source node to completely specify the routing vector when the message is injected into the network.

Vector Routing

The vector routing feature of router chip 50 is used to for access to router registers and some interface circuit registers. Vector routing provides network exploration and routing table initialization and is a low performance routing. The vector routing function permits software to probe the network topology and set up routing tables and ID fields through uncached reads and writes. Once software programs a vector route in a vector route register, software may execute uncached reads and writes which initiate vector route packets.

In one embodiment, vector route messages are always two micropackets in length. The first micropacket is a standard header, with command encoding indicating read or write, and direction field indicating router core. Whenever a vector route header enters a router chip 50, the vector route header is routed directly to router local block 114. Once inside router local block 114, the second micropacket is examined for the vector route data. Vector route data consists of a vector having vector elements, which each comprise a direction pointer. Direction pointers may include either an output port ID or a vector terminator.

At each hop during the request phase of the vector route, local block 114 examines the current vector and routes according to the right-most vector element. The entire route vector is then shifted right by the number of bits in a vector element, and a return direction port ID is shifted in as the most significant bits. A vector request routed message has reached its destination when the right-most vector element contains binary some indicator, such as for example, 0000 for a four bit vector element.

Once the request packet reaches its destination (the current request vector is all 0s), a response header is formulated and the message is sent back to the port it entered on, but on the reply virtual channel. The new vector is generated such that the least significant nibble becomes the most significant nibble. As a response makes its way through the network, the right-most vector elements are used to route the message and the vector is shifted right. The message eventually reaches the originating node via the same route on which it left.

Table-Driven Routing

All message packets routed by scalable interconnection network 28 during normal operation are routed via routing tables, such as routing tables 104 and 106. Routing tables 104 and 106 are distributed across scalable interconnection network 28 each port of each router and provide a high-speed, flexible routing strategy which can be adapted through software. Routing tables 104 and 106 determine the path taken by messages between any two nodes in the system. Routing tables 104 and 106 must be programmed in a way which does not introduce any cycles in the directed routing graphs. As dictated by routing tables 104 and 106, the physical message paths are static. The message paths are programmed into routing tables 104 and 106 by software. In the event that a fault develops in scalable interconnection network 28, the static routes dictated by routing tables 104 and 106 can be modified during system operation. However, this software manipulation of routing tables 104 and 106 can be used only for fault avoidance, not for congestion control. Thus, one embodiment scalable interconnection network 28 never routes a message adaptively through the network by "skipping" a desired route when a necessary link is unavailable due to congestion.

Unless noted otherwise, the following routing table discussion refers to a system having two processors per node, such as the system illustrated in FIG. 2 above. A router table is indexed by a network destination identification (ID) and provides the next direction a message should travel. Optimally, a router table has a unique entry for each other node in the system. Since this solution is not typically feasible due to the size of the table required, the routing tables, according to the present invention, are broken into a two-level hierarchy. In one embodiment of this two-level hierarchy, there is one router table entry for each of 128 nodes (64 routers) to a given local subnetwork or global partition, as well as a router table entry for each of up to 16 local subnetworks.

Table I at the end of this Description of the Preferred Embodiments section provides one specific example of a TLB mapping showing how the node destination address is broken into global portions for addressing into the global and local tables for a system scalable from 2 to 2048 nodes. The specific example TLB mapping of Table I show how the global and local address bits can be interleaved if desired to accommodate certain physical configurations.

Table II at the end of this Description of the Preferred Embodiments section provides another specific example of a TLB mapping showing how the node destination address is broken into global portions for addressing into the global and local tables for a system scalable from 2 to 256 nodes. The specific example TLB mapping of Table II shows how the global and local address bits are not interleaved for accommodating certain other physical configurations. The specific example TLB mapping of Table II also shows that this system embodiment of up to 256 nodes includes two extra local bits and one extra global to permit future expansion from 272 to 4096 nodes.

In one embodiment, the global destination ID portion must have exactly one bit in the least significant five bits of the destination for systems with greater than 512 nodes. This ensures that an invalidate engine (not shown) maps out nodes appropriately in systems greater than 512 nodes. Without this, the upgrade path would require a 32 node increment to be spread across two half populated cabinets. For systems having less than or equal to 128 nodes, the global bits are preferably avoided all together. This allows for more routing flexibility and less required configuration, as all routing comes from the local table. It should, however, be noted that the scheme used for greater than 128 nodes may also be used for less than or equal to 128 nodes.

A given router chip 50 in the scalable interconnect network 28 must decide whether to use the global or local table to look up a direction to take. The value looked up is not used immediately, but is attached to the packet header and used on the next router chip.

FIG. 19A illustrates a router table lookup mechanism illustrated generally at 200. As indicated in FIG. 19A, a physical destination ID indicated at 202 includes a global destination ID portion 204 and a local destination ID portion 206. In the embodiment illustrated in FIG. 19A, global destination ID 204 includes four bits, while the local destination ID 206 includes seven bits. Global destination ID 204 indexes global routing table 104 having entries 208. Local destination ID 206 indexes local routing table 106 having entries 210. Global destination ID 204 is compared, as indicated at decision point 212, to a current node's global address stored in register 214. Global destination ID 204 is also compared at decision point 216 to a next − global address stored in register 218. Global destination ID 204 is also compared at decision point 220 to a next + global address stored in register 222.

A direction field from the message header is indicated at 224 and is four bits in the embodiment illustrated FIG. 19A. Direction field 224 from the message header 224 is compared at decision point 224 to − global direction bits stored in register 226. Direction field 224 from the message header is also compared at decision point 228 to + global direction bits stored in register 230. The output from decision points 220 and 228 and a + global valid bit stored in register 232 are logically AND'd by an AND gate 234. Similarly, the output of decision points 216 and 224 and a -global valid bit stored in register 236 are logically AND'd by an AND gate 238. The outputs of AND gates 234 and 238, the output of decision point 212, and a force local table bit stored in register 240 are logically OR'd by an OR gate 242.

FIG. 19B illustrates an example entry 210 for local router table 106. Local router table entry 210 includes a − global direction field, a + global direction field, and a local direction field. In the embodiment illustrated in FIG. 19A, local router table 106 provides the − global direction field on a line 244, the + global direction field on a line 246, and the local direction field on a line 248 to a multiplexer 250. Multiplexer 250 provides one of the direction fields 244, 246, or 248 to one input of a multiplexer 254 based on the state of the outputs of AND gates 234 and 238. Global table 104 provides a global direction field on a line 252 to a second input of multiplexer 254. Multiplexer 254 provides either the global direction field from line 252 or the selected direction field from multiplexer 250 to an output line 256 based on a force local signal provided from OR gate 242. The selected four bit direction field from multiplexer 254 provided on line 256 includes an exit port ID of three bits to determine through which one of the eight ports of the next router chip 50 the message is to be routed, and includes a virtual channel least significant bit (1sb).

In the operation of the embodiment of the router table lookup mechanism of FIG. 19A, local router table 106 provides an exhaustive list of local destinations within a local subnetwork, and global router table 104 provides an exhaustive list for each global destination. Local router table 106 is used to determine the next direction when the global bits of the destination ID match the global address of the current router or they match that of the plus or minus neighboring local subnetwork and the output port is the one designated as that which connects directly to that neighboring local subnetwork. When the global bits of the destination ID do not match the global address of the current router chip 50, global router table 104 is used to determine the next direction. In one embodiment, the global ID/port registers 214, 218, 222, 226, 230, 232, and 234 and the force local table register 240 in each router chip 50 are software programmable via a global port definition register (not shown) in router local block 114.

Figure 20:
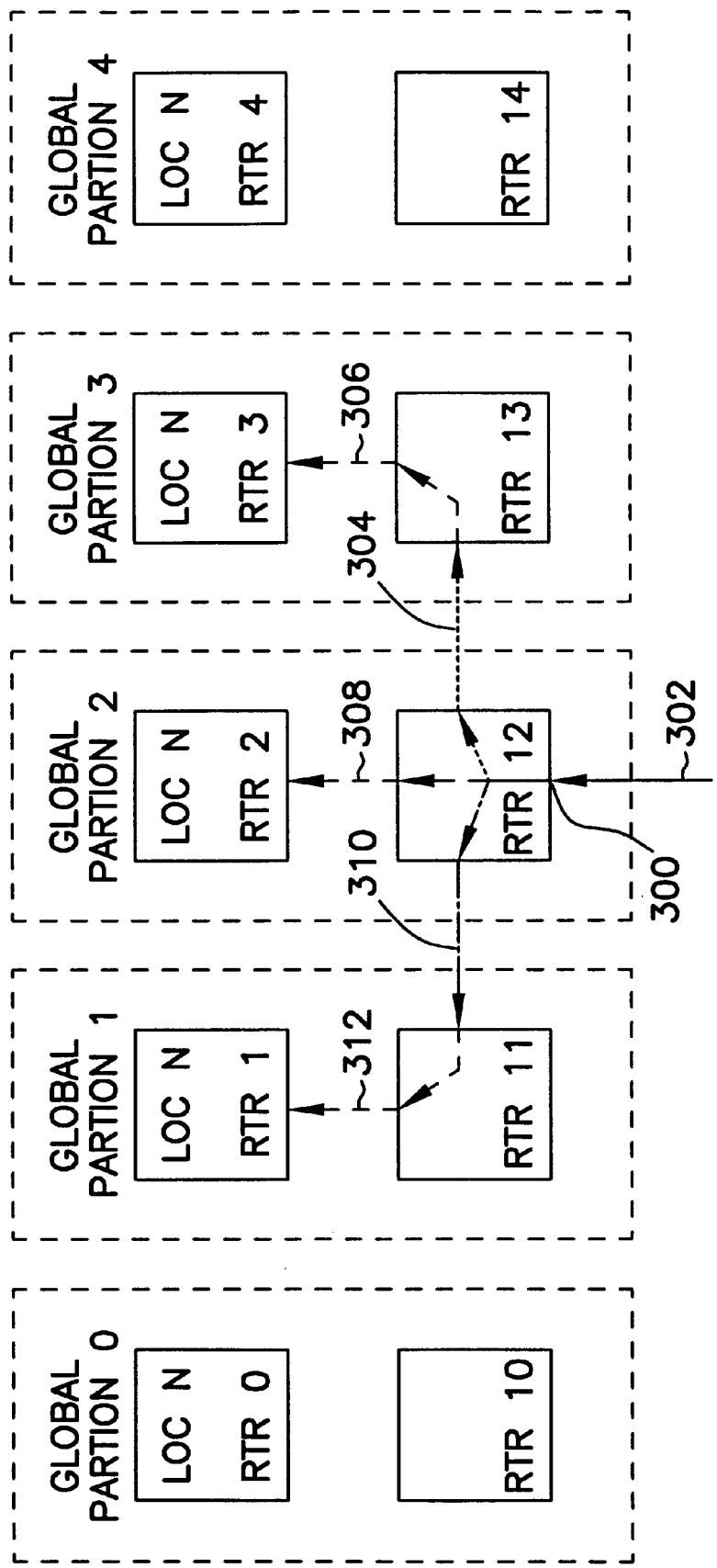
FIG. 20 is a diagram of an example set of routes through a network where a set of destination addresses all have the same local destination address, but have different global destination addresses.

An Example set of routes through a network where a set of destination addresses all have the same local destination address, but have different global destination addresses is illustrated in diagram form in FIG. 20. In this example, three routes are performed. All of the three routes only use the local router table entries. The dashed lines represent hops in a given route that carry the local direction field of the local router table; the dotted lines represent hops in a given route that carry the + global direction field in the local router table;

and the dotted/dashed lines represent hops in a given route that carry the − global direction field. This particular example does not illustrate any hops that carry the global router table entries.

In FIG. 20, the first route passes through an input port 300 of router 12, as indicated by solid line 302. The first route is then routed from router 12 in global partition 2 to router 13 in global partition 3 carrying the + global direction field in the local router table, as indicated by dotted line 304. The first route is then routed from router 13 in global partition 3 to the router 3 (the destination) in global partition 3 carrying the local direction field in the local router table, as indicated by dashed line 306.

In FIG. 20, the second route passes through input port 300 of router 12, as indicated by solid line 302. The second route is then routed from router 12 in global partition 2 to the router 2 (the destination) in global partition 2 carrying the local direction field in the local router table, as indicated by dashed line 308.

In FIG. 20, the third route passes through input port 300 of router 12, as indicated by solid line 302. The third route is then routed from router 12 in global partition 2 to router 11 in global partition 1 carrying the − global direction field in the local router table, as indicated by dotted/dashed line 310. The third route is then routed from router 11 in global partition I to the router I (the destination) in global partition 1 carrying the local direction field in the local router table, as indicated by dashed line 312.

Figure 21:
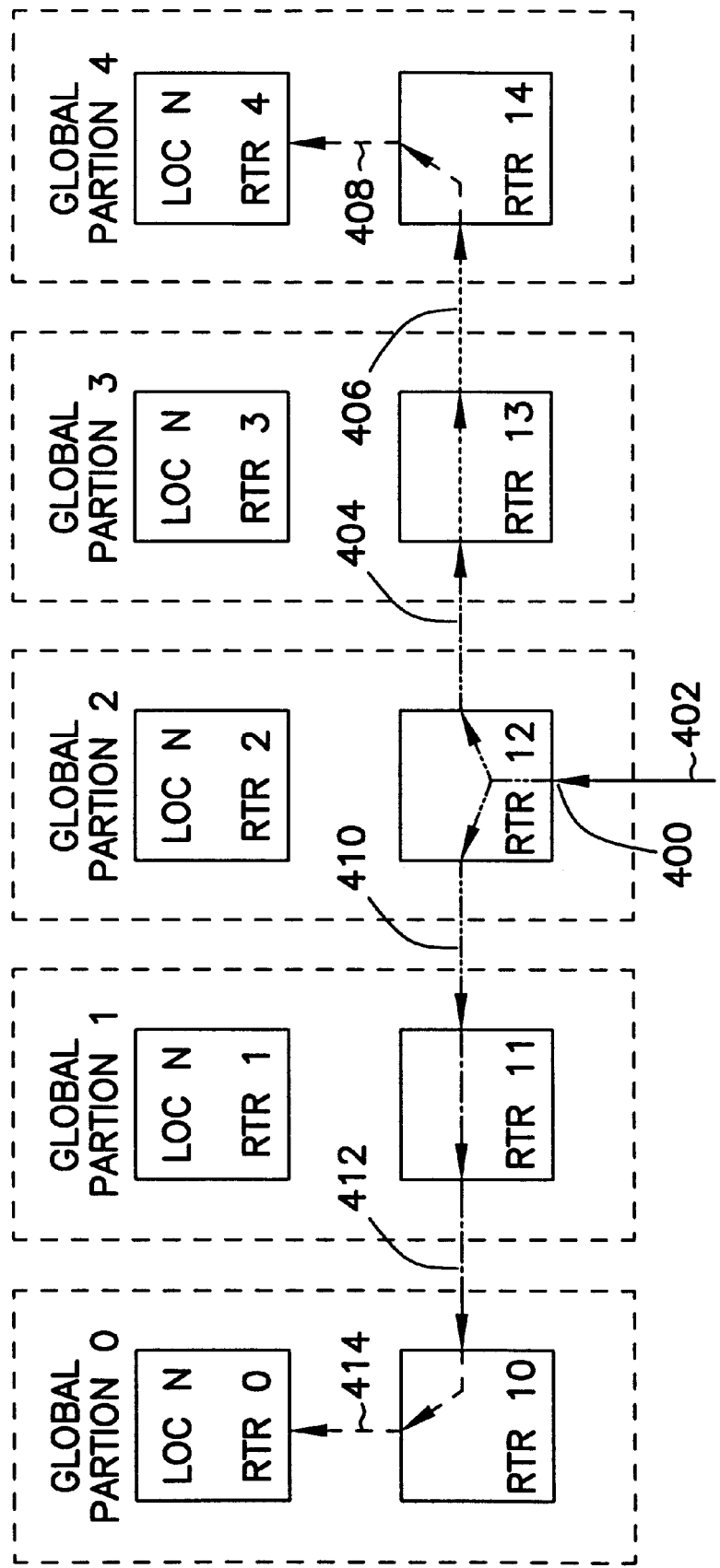
FIG. 21 is another diagram of an example set of routes through a network where a set of destination addresses all have the same local destination address, but have different global destination addresses.

Another example set of routes through a network where a set of destination addresses all have the same local destination address, but have different global destination addresses is illustrated in diagram form in FIG. 21. In this example, two routes are performed. The dashed lines represent hops in a given route that carry the local direction field of the local router table; the dotted lines represent hops in a given route that carry the + global direction field in the local router table; the single dotted/single dashed lines represent hops in a given route that carry the − global direction field; and the double dotted/single dashed lines represent hops in a given route that carry the global router table entry.

In FIG. 21, the first route passes through an input port 400 of router 12, as indicated by solid line 402. The first route is then routed from router 12 in global partition 2 to router 13 in global partition 3 carrying the global entry in the global router table, as indicated by double dotted/single dashed line 404. The first route is then routed from router 13 in global partition 3 to router 14 in global partition 4 carrying the + global direction field in the local router table, as indicated by dotted line 406. The first route is then routed from router 14 in global partition 4 to the router 4 (the destination) in global partition 4 carrying the local direction field in the local router table, as indicated by dashed line 408.

In FIG. 21, the second route passes through input port 400 of router 12, as indicated by solid line 402. The second route is then routed from router 12 in global partition 2 to router 11 in global partition 1 carrying the global entry in the global router table, as indicated by double dotted/single dashed line 410. The second route is then routed from router 11 in global partition 1 to router 10 in global partition 0 carrying the − global direction field in the local router table, as indicated by single dotted/single dashed line 412. The second route is then routed from router 10 in global partition 0 to the router 0 (the destination) in global partition 0 carrying the local direction field in the local router table, as indicated by dashed line 414.

Virtual Channels

Four virtual channels, such as indicated at 90, 92, 94, and 96 for port 52, are assigned to each physical channel, where two virtual channels are assigned to requests and two virtual channels are assigned to responses. The scalable interconnect network 28 utilizes the virtual channels to perform deadlock-free routes, create separate request and reply networks, and provide reserved buffers for congestion relief for certain messages. Each message is associated with one of the four virtual channels. In one embodiment, when a message enters a router port, the message is written into the virtual channel buffer indicated by a virtual channel field in the sideband. Congestion control is achieved by allowing messages to switch between the two virtual channels.

In one embodiment, a single physical router link supports interleaving of messages on different virtual channels, but within one virtual channel a message must remain continuous. For example, after router chip 50 sends four micropackets across a physical link on virtual channel 0, router chip 50 can choose to send any number of packets on virtual channels 1–3 before returning to virtual channel 0 to complete the first message. This feature allows router chip 50 to maximize utilization of virtual channel buffers by sending partial messages when only a small amount of space is available at the destination.

In one embodiment, high priority messages can also cut through lower priority messages across a given physical link, assuming the messages do not share the same virtual channel. In order to implement this virtual channel cutthrough, each micropacket must be tagged with its virtual channel number in a sideband. This is why virtual channel identification is not contained in the message header in this embodiment.

Deadlock Avoidance

Scalable interconnect network 28 must break cycles of dependencies, as these would cause the network to deadlock. The three types of cyclic dependencies that scalable interconnect network 28 is designed to break are: 1) request-response cycles; 2) turn cycles; and 3) physical cycles. The latter two may only have a semantic difference, but they are differentiated below.

Requests trigger responses which means that cycles are introduced if they use dependent resources. This cycle is broken through the use of virtual channels. All requests travel on one class of virtual channel and all responses on another class of virtual channel. In one embodiment, cache coherency mechanisms in interface circuit guarantee that all traffic fits into one of these two classes, and that no dependencies are introduced from requests to responses or from responses to requests.

As to turn cycles, if turns are not restricted, traffic can loop back on itself. Restrictions to avoid turn cycles are implemented through appropriate loading of the router tables. In one embodiment, the restrictions are as follows: [z, $-y_{nc}$, $-x_{nc}$], [y, $-x_{nc}$], [x]. The subscript "nc" indicates "no crossing." That is, do not cross a dateline in that dimension. The concept of datelines is described in detail in the Thorson et al. U.S. Pat. No. 5,659,796, which is assigned to Cray Research, Inc. and is herein incorporated by reference. In other words, the above restrictions cause routing to be performed in three phases as follows:

1. +z, −z, −y, and −x can be routed in any order, but the dateline cannot not be crossed in x or y;

2. +y, −y, and −x can be routed in any order, but the dateline cannot be crossed in x; and 3. x can be completed.

In one embodiment, router chip 50 does not support reflections (i.e., same entrance and exit port). This scheme, combined with the system growth path, provides deadlock avoidance, full use of bisection bandwidth, and multiple paths between nodes.

As to physical cycles, in one embodiment virtual channels are used to break physical cycles in double bristled systems with greater than 128 nodes, such as for a 4×8×4 double bristled torus topology 256 node system. Physical cycles are only a concern for cycles with greater than four vertices, such as for the Y dimension of the 4×8×4 torus topology system.

Figure 22:
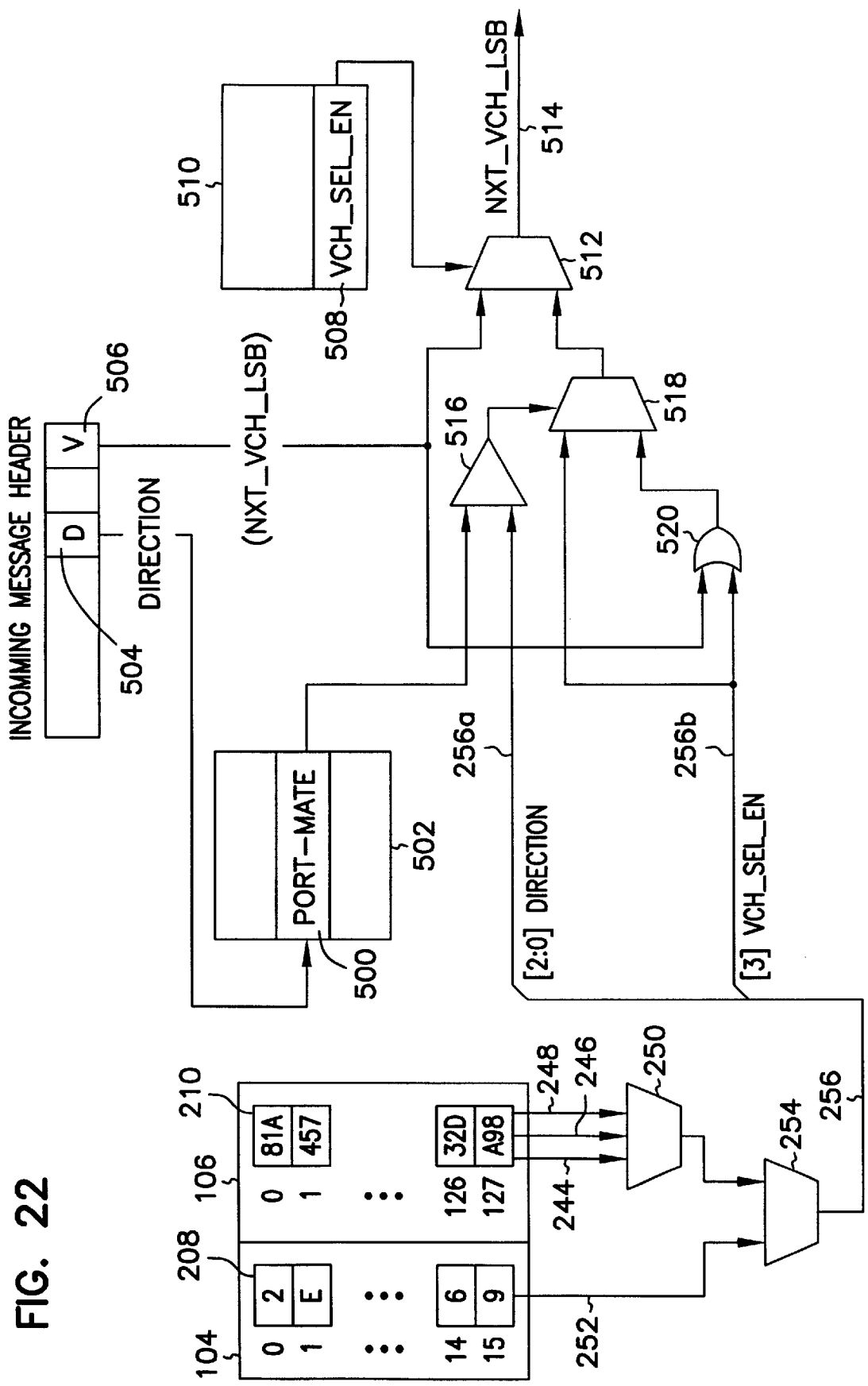
FIG. 22 is a diagram of a mechanism according to the present invention to accomplish the appropriate virtual channel assignment.

A mechanism according to the present invention to accomplish the appropriate virtual channel assignment is illustrated in diagram form in FIG. 22. In this mechanism, the six inter-router ports, such as ports 52, 54, 56, 58, 60, and 62 of router chip 50 illustrated in FIG. 2, are divided into three pairs, where each pair defines a dimension. In one embodiment, this pairing is accomplished via a port_mate field 500 stored in a port information register 502 in router chip 50. Port_mate field 500 is a three bit field that matches the lower three bits of the direction field, indicated at 504, on an incoming header packet. The three bit port_mate field 500 is relative to the input port. Table III at the end of this Description of the Preferred Embodiments section provides one embodiment of each input port's relative mate.

The least significant bit (lsb) of the first word of the header micropacket is defined as the "V" bit, indicated at 506, which becomes the lsb of the output virtual channel (nxt_vch_lsb). The next router chip 50 in a given route employs the nxt_vch_lsb to determine which type of virtual channel should be used for routing from the next router chip 50. A virtual channel select enable (vch_sel_en) bit 508 stored in a global information register 510 in router chip 50 is used to control a multiplexer 512. If the vch_sel_en bit 508 is cleared, the nxt_vch_lsb bit is used to indicate the lsb of the next link on line 514 from multiplexer 512. In smaller systems (e.g., less than or equal to 128 nodes in one embodiment), the vch_sel_en bit 508 is cleared, which causes packets to route from source to destination on the same virtual channel.

On larger systems (e.g., greater than 128 nodes in one embodiment), the vch_sel_en bit 508 is set and the lsb of the virtual channel on line 514 is set using virtual channel lsb on line 256b from the indexed entry from router table 104 or 106 and the port_mate field 500. The indexing of router tables 104 and 106 is described above and illustrated in FIGS. 19A–B. A comparator 516 compares the direction field on line 256a from the indexed entry from router table 104 or 106 to the port_mate field 500 from port information register 502 to determine whether the output port of the next router chip is the mate to the input port of the next router chip. The output of comparator 516 controls a multiplexer 518, which provides its output to multiplexer 512.

If the vch_sel_en bit 508 is set and the output port is the mate to the input port, the virtual channel lsb on line 256b from lookup table 104 or 106 is logically OR'd with the incoming nxt_vch_lsb bit 506 by an OR gate 520, and this OR'd value is provided as the nxt_vch_lsb on line 514. If the vch_sel_en bit is set and the output port is not the mate to the input port, the nxt_vch_lsb on line 514 is the virtual channel lsb on line 256b from lookup table 104 or 106.

The above mechanism according to the present invention to accomplish the appropriate virtual channel assignment for larger torus systems having at least one radix greater than four can be expressed as follows:

1. Determine if route is straight (i.e, within one dimension) or if route is turning corner (i.e, switching dimensions);
2. If route is turning corner then the nxt_vch_lsb is the virtual channel bit from the routing tables;
3. If route is straight, then the nxt_vch_lsb is obtained by logically ORing the virtual channel bit from routing tables with the virtual channel bit from message header.

Figure 23:
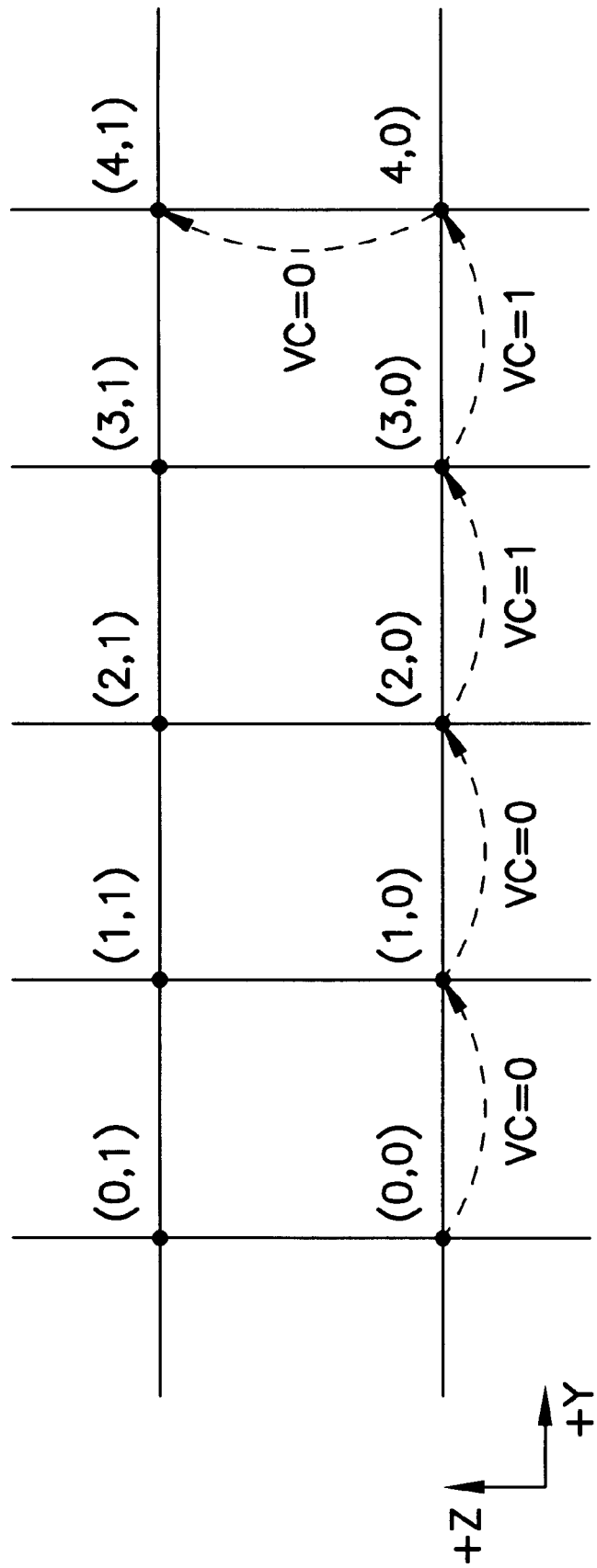
FIG. 23 is a diagram illustrating the operation of the mechanism of FIG. 22.

The operation of this mechanism for appropriate virtual channel assignment for larger torus systems having at least one radix greater than four is illustrated in diagram form in FIG. 23. In FIG. 23, only the Y and Z dimensions are illustrated, because in the embodiment of FIG. 10, the X dimension is held at a radix of four. FIG. 23 illustrates a route starting on virtual channel 0 from (Y,Z) source (0,0) to (Y,Z) destination (4,1). As illustrated, virtual channel 0 is used to route from router chip (0,0) to router chip (1,0). Virtual channel 0 is used to route from router chip (1,0) to router chip (2,0).

However, in router chip (1,0) the virtual channel bit from the router tables is a one, because of a dateline crossing. The virtual channel bit from the router tables in router chip (1,0) is logically OR's with the incoming V bit, which produces a one. Thus, virtual channel 1 is used to route from router chip (2,0) to router chip (3,0). Once on virtual channel 1, the route stays on virtual channel 1, until a corner is turned. Thus, virtual channel I is used to route from router chip (3,0) to router chip (4,0). However, in router chip (3,0), the virtual channel bit from the router tables is a zero, which determines the virtual channel to be used on the corner turn route from router chip (4,0) to router chip (4,1). Thus, virtual channel 0 is used to route from router chip (4,0) to router chip (4,1).

This design approach permits virtual channel switches at a dateline crossing or at all corner turns (i.e., switching dimensions). The lsb of the virtual channel field is used to prevent deadlock in the torus topology in large systems having more than four locations in at least one dimension, such as for a 4×8×4 torus topology. This allows deadlock free and virtual channel balanced network to be implemented in software. It also allows smaller systems which are deadlock free by nature, to assign certain reference types. For example in one embodiment of a smaller system, I/O references are assigned to virtual channels I and 3, while normal processor-to-processor communication are assigned virtual channels 0 and 2.

Resiliency

With the hypercube and torus topologies described above, router chip 50 achieves the goal of always having at least two non-overlapping paths connecting every pair of nodes connected to a router chip 50. Typically, there are multiple paths available. This permits the system to bypass broken router chips or network links. In addition, in one embodiment, each network link is protected by a check code and link-level logic which retries any corrupted transmissions and provides tolerance of transient errors.

In this way, the hypercube and torus topologies described above can sustain multiple faults and still be reconfigured in a fully connected fashion. In addition, the two-level router table (router tables 104 and 106), when properly implemented, contains only a few models which are connected but cannot be routed, and these typically are unlikely and degenerate cases.

Conclusion

The present invention, as described above, permits small systems to be constructed in a hypercube topology which offers high bandwidth connections, low latencies, and physical link redundancy while maintaining linear bisection bandwidths as systems scale. Nevertheless, as systems increase the number of processors, the number of physical connections required to support the hypercube topology increases significantly, resulting in higher system costs and manufacturing complexities. To this end, larger systems according to the present invention can be constructed in a torus topology having more than four locations in at least one dimensions.

Such torus topologies according to the present invention permit system performance to be maintained at a relatively high level, yet reduce the number of physical connections between processors. With fewer physical connections between processors, system costs are significantly reduced. Since the torus connection is a ring of processors which grows as systems become larger, multiple torus rings can be formed in the system to keep interconnect bandwidth high and latencies between processors low.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

TABLE III

Encoding of Port_Mate Field

| Output Port | PTA Input Port | PTB Input Port | PTC Input Port | PTD Input Port | PTE Input Port | PTF Input Port | PTG Input Port | PTH Input Port |
|---|---|---|---|---|---|---|---|---|
| A | n/a | 7 | 6 | 5 | 4 | 3 | 2 | 1 |
| B | 1 | n/a | 7 | 6 | 5 | 4 | 3 | 2 |
| C | 2 | 1 | n/a | 7 | 6 | 5 | 4 | 3 |
| D | 3 | 2 | 1 | n/a | 7 | 6 | 5 | 4 |
| E | 4 | 3 | 2 | 1 | n/a | 7 | 6 | 5 |
| F | 5 | 4 | 3 | 2 | 1 | n/a | 7 | 6 |
| G | 6 | 5 | 4 | 3 | 2 | 1 | n/a | 7 |
| H | 7 | 6 | 5 | 4 | 3 | 2 | 1 | n/a |

What is claimed is:

1. A multiprocessor computer system comprising:
a plurality of processing element nodes, each processing element node having at least one processor and memory;
physical communication links interconnecting the processing element nodes in a n-dimensional topology, which includes at least two global partitions of processing element nodes;

TABLE I

Example TLB Mapping of Dimensions to Physical Node Number

| Node Count | Network Dimensions x | y | z | $N_{10}$ $G_3$ | $N_9$ $L_6$ | $N_8$ $G_2$ | $N_7$ $L_5$ | $N_6$ $G_1$ | $N_5$ $L_4$ | $N_4$ $G_0$ | $N_3$ $L_3$ | $N_2$ $L_2$ | $N_1$ $L_1$ | $N_0$ $L_0$ |
|---|---|---|---|---|---|---|---|---|---|---|---|---|---|---|
| 1056 to 2048 | 4 | 16 | 16 | $z_3$ | $y_3$ | $z_2$ | $y_2$ | $z_1$ | $y_1$ | $z_0$ | $y_0$ | $x_1$ | $x_0$ | nd |
| 544 to 1024 | 4 | 16 | 8 | 0 | $y_3$ | $z_2$ | $y_2$ | $z_1$ | $y_1$ | $z_0$ | $y_0$ | $x_1$ | $x_0$ | nd |
| 264 to 512 | 4 | 8 | 8 | 0 | 0 | $z_2$ | $y_2$ | $z_1$ | $y_1$ | $z_0$ | $y_0$ | $x_1$ | $x_0$ | nd |
| 132 to 256 | 4 | 8 | 4 | 0 | 0 | 0 | $y_2$ | $z_1$ | $y_1$ | $z_0$ | $y_0$ | $x_1$ | $x_0$ | nd |
| 68 to 128 | 4 | 4 | 4 | 0 | $z_1$ | 0 | $y_1$ | 0 | $z_0$ | 0 | $y_0$ | $x_1$ | $x_0$ | nd |
| 33 to 64 | 4 | 4 | 2 | 0 | 0 | 0 | $y_1$ | 0 | $z_0$ | 0 | $y_0$ | $x_1$ | $x_0$ | nd |
| 17 to 32 | 4 | 2 | 2 | 0 | 0 | 0 | 0 | 0 | $z_0$ | 0 | $y_0$ | $x_1$ | $x_0$ | nd |
| 9 to 16 | 2 | 2 | 2 | 0 | 0 | 0 | 0 | 0 | $z_0$ | 0 | $y_0$ | 0 | $x_0$ | nd |
| 5 to 8 | 1 | 1 | 1 | 0 | 0 | 0 | 0 | 0 | 0 | 0 | $y_0$ | 0 | $x_0$ | nd |
| 3 to 4 | 1 | 1 | 1 | 0 | 0 | 0 | 0 | 0 | 0 | 0 | 0 | 0 | $x_0$ | nd |
| 2 | 1 | 1 | 1 | 0 | 0 | 0 | 0 | 0 | 0 | 0 | 0 | 0 | 0 | nd |

TABLE II

Example TLB Mapping of Dimensions to Physical Node Number

| Node Count | Network Dimensions x | y | z | $D_{10}$ $G_3$ | $D_9$ $L_6$ | $D_8$ $L_5$ | $D_7$ $G_2$ | $D_6$ $G_1$ | $D_5$ $G_0$ | $D_4$ $L_4$ | $D_3$ $L_3$ | $D_2$ $L_2$ | $D_1$ $L_1$ | $D_0$ $L_0$ |
|---|---|---|---|---|---|---|---|---|---|---|---|---|---|---|
| 272 to 4096[a] | ? | ? | ? | $f_2$ | $f_1$ | $f_0$ | $y_2$ | $y_1$ | $y_0$ | $z_1$ | $z_0$ | $x_1$ | $x_0$ | nd |
| 132 to 256 | 4 | 8 | 4 | 0 | 0 | 0 | $y_2$ | $y_1$ | $y_0$ | $z_1$ | $z_0$ | $x_1$ | $x_0$ | nd |
| 68 to 128 | 4 | 4 | 4 | 0 | 0 | 0 | 0 | $y_1$ | $y_0$ | $z_1$ | $z_0$ | $x_1$ | $x_0$ | nd |
| 33 to 64 | 4 | 2 | 4 | 0 | 0 | 0 | 0 | 0 | $y_0$ | $z_1$ | $z_0$ | $x_1$ | $x_0$ | nd |
| 17 to 32 | 4 | 1 | 4 | 0 | 0 | 0 | 0 | 0 | 0 | $z_1$ | $z_0$ | $x_1$ | $x_0$ | nd |
| 9 to 16 | 4 | 1 | 2 | 0 | 0 | 0 | 0 | 0 | 0 | 0 | $z_0$ | $x_1$ | $x_0$ | nd |
| 5 to 8 | 4 | 1 | 1 | 0 | 0 | 0 | 0 | 0 | 0 | 0 | 0 | $x_1$ | $x_0$ | nd |
| 3 to 4 | 1 | 1 | 1 | 0 | 0 | 0 | 0 | 0 | 0 | 0 | 0 | 0 | $x_0$ | nd |
| 2 | 1 | 1 | 1 | 0 | 0 | 0 | 0 | 0 | 0 | 0 | 0 | 0 | 0 | nd |

[a]Future expansion routers for routing messages between the plurality of processing element nodes on the physical communication links, each router including:

ports for receiving and sending messages, and lookup tables associated to ports and holding entries having directions for routing from a next router along a given route, each lookup table including a local router table having directions for routing between processor element nodes within a global partition, and a global router table having directions for routing between processor element nodes located in different global partitions, wherein the directions from the local table are selected for routing from the next router if a current processing element node is in a destination global partition or if the current processing element node is one plus or minus hop from reaching the destination global partition and the given route is exiting on a port that routes to the destination global partition, else the directions from the global router table are selected for routing from the next router.

2. The multiprocessor computer system of claim 1 wherein the topology is a torus topology, wherein at least one of the n dimensions has a radix greater than four.

3. The multiprocessor computer system of claim 1 wherein each router further includes a programmable register having a force local table bit, that, when set, causes the directions from the local table to be selected for routing from the next router.

4. The multiprocessor computer system of claim 1 wherein each router further includes programmable registers having a plus global valid bit and a minus global valid bit, such that the directions from the local table are selected for routing from the next router if the current processing element node is in the destination global partitions or if the current processing element node is one plus hop from reaching the destination global partition and the plus global valid bit is set and the route is exiting on a port that routes to the destination global partition or if the current processing element node is one minus hop from reaching the destination global partition and the minus global valid bit is set and the route is exiting on a port that routes to the destination global partition, else the directions from the global router table are selected for routing from the next router.

5. The multiprocessor computer system of claims 1 wherein the local table includes local table entries, wherein each local router table entry includes a –global direction field, a +global direction field, and a local direction field.

6. The multiprocessor computer system of claim 5 wherein the local direction field is selected for routing from the next router if the current processing element node is in the destination global partitions, the –global direction field is selected for routing from the next router if the current processing element node is one minus hop from reaching the destination global partition and the route is exiting on a port that routes to the destination global partition, and the +global direction field is selected for routing from the next router if the current processing element node is one plus hop from reaching the destination global partition and the route is exiting on a port that routes to the destination global partition.

7. The multiprocessor computer system of claim 1 wherein when the topology is a six or less dimensional hypercube, only the local router table is used to obtain the directions for routing from the next router.

* * * * *